(12) United States Patent
Carlson et al.

(10) Patent No.: US 8,121,942 B2
(45) Date of Patent: Feb. 21, 2012

(54) SYSTEMS AND METHODS FOR SECURE AND TRANSPARENT CARDLESS TRANSACTIONS

(75) Inventors: Mark Carlson, Cupertino, CA (US); Surendra Keshan, Cupertino, CA (US); Patrick Faith, Pleasanton, CA (US)

(73) Assignee: Visa U.S.A. Inc., San Francisco, CA (US)

(*) Notice: Subject to any disclaimer, the term of this patent is extended or adjusted under 35 U.S.C. 154(b) by 0 days.

(21) Appl. No.: 12/143,509

(22) Filed: Jun. 20, 2008

(65) Prior Publication Data

US 2008/0319869 A1    Dec. 25, 2008

Related U.S. Application Data

(60) Provisional application No. 60/946,113, filed on Jun. 25, 2007, provisional application No. 61/034,904, filed on Mar. 7, 2008.

(51) Int. Cl.
*G06Q 40/00* (2006.01)

(52) U.S. Cl. .................. 705/39; 705/26; 705/44

(58) Field of Classification Search .......... 705/26, 705/44, 36, 39, 26.81; 235/380
See application file for complete search history.

(56) References Cited

U.S. PATENT DOCUMENTS

| | | |
|---|---|---|
| 4,528,442 A | 7/1985 | Endo |
| 5,177,342 A | 1/1993 | Adams |
| 5,254,843 A | 10/1993 | Hynes et al. |
| 5,311,594 A | 5/1994 | Penzias |
| 5,420,926 A | 5/1995 | Low et al. |
| 5,434,398 A | 7/1995 | Goldberg |
| 5,465,387 A | 11/1995 | Mukherjee |
| 5,513,250 A | 4/1996 | McAllister |
| 5,530,438 A | 6/1996 | Bickham et al. |
| 5,539,810 A | 7/1996 | Kennedy et al. |
| 5,615,110 A | 3/1997 | Wong |
| 5,625,689 A | 4/1997 | Indeck et al. |
| 5,627,355 A | 5/1997 | Rahman et al. |
| 5,708,422 A | 1/1998 | Blonder et al. |
| 5,740,244 A | 4/1998 | Indeck et al. |
| 5,774,525 A | 6/1998 | Kanevsky et al. |
| 5,812,668 A | 9/1998 | Weber |

(Continued)

FOREIGN PATENT DOCUMENTS

KR    10-2001-0044769 A    6/2001

(Continued)

OTHER PUBLICATIONS

U.S. Appl. No. 12/143,394, filed Jun. 20, 2008.

(Continued)

*Primary Examiner* — Jason M Borlinghaus
*Assistant Examiner* — Samica L Norman
(74) *Attorney, Agent, or Firm* — Kilpatrick Townsend & Stockton; David B. Raczkowski

(57) ABSTRACT

Systems, methods, and apparatus for handling and/or authorizing payment requests by a consumer for a transaction are provided. Payment information can be sent directly from a consumer to a non-merchant, thereby allowing no new entities to obtain the payment information. Transaction identifiers can be used to facilitate communications among the entities. The payment information can be sent to the non-merchant via a merchant application with a submit payment button directed to the non-merchant so little or no deviations from standard practices are required.

30 Claims, 10 Drawing Sheets

U.S. PATENT DOCUMENTS

| | | |
|---|---|---|
| 5,819,226 A | 10/1998 | Gopinathan et al. |
| 5,834,747 A | 11/1998 | Cooper |
| 5,872,834 A | 2/1999 | Teitelbaum |
| 5,878,337 A | 3/1999 | Joao et al. |
| 5,903,830 A | 5/1999 | Joao et al. |
| 5,914,472 A | 6/1999 | Foladare et al. |
| 5,920,628 A | 7/1999 | Indeck et al. |
| 5,988,497 A | 11/1999 | Wallace |
| 6,012,144 A | 1/2000 | Pickett |
| 6,029,154 A | 2/2000 | Pettitt |
| 6,047,268 A | 4/2000 | Bartoli et al. |
| 6,064,990 A | 5/2000 | Goldsmith |
| 6,095,413 A | 8/2000 | Tetro et al. |
| 6,157,707 A | 12/2000 | Baulier et al. |
| 6,263,447 B1 | 7/2001 | French et al. |
| 6,327,578 B1 | 12/2001 | Linehan |
| 6,330,550 B1 | 12/2001 | Brisebois et al. |
| 6,496,936 B1 | 12/2002 | French et al. |
| 6,505,171 B1 | 1/2003 | Cohen et al. |
| 6,529,725 B1 | 3/2003 | Joao et al. |
| 6,535,855 B1 | 3/2003 | Cahill et al. |
| 6,560,581 B1 | 5/2003 | Fox et al. |
| 6,632,248 B1 | 10/2003 | Isaac et al. |
| 6,684,250 B2 | 1/2004 | Anderson et al. |
| 6,732,082 B1 | 5/2004 | Gavan et al. |
| 6,832,721 B2 | 12/2004 | Fujii |
| 6,836,670 B2 | 12/2004 | Casstrogiovanni et al. |
| 6,857,073 B2 | 2/2005 | French et al. |
| 6,899,269 B1 | 5/2005 | Deland |
| 6,913,194 B2 | 7/2005 | Suzuki |
| 7,003,497 B2 | 2/2006 | Maes |
| 7,004,382 B2 | 2/2006 | Sandru |
| 7,024,396 B2 | 4/2006 | Woodward |
| 7,044,394 B2 | 5/2006 | Brown |
| 7,051,002 B2 | 5/2006 | Keresman, III et al. |
| 7,096,003 B2 | 8/2006 | Joao et al. |
| 7,100,049 B2 | 8/2006 | Gasparini et al. |
| 7,143,095 B2 | 11/2006 | Barrett et al. |
| 7,165,051 B2 | 1/2007 | Ronning et al. |
| 7,225,156 B2 | 5/2007 | Fisher et al. |
| 7,231,657 B2 | 6/2007 | Honarvar et al. |
| 7,249,093 B1 | 7/2007 | King |
| 7,272,728 B2 | 9/2007 | Pierson |
| 7,273,168 B2 | 9/2007 | Linlor |
| 7,319,978 B2 * | 1/2008 | Minamishin et al. ...... 705/26.81 |
| 7,330,871 B2 | 2/2008 | Barber |
| 7,343,149 B2 | 3/2008 | Benco |
| 7,357,310 B2 | 4/2008 | Calabrese et al. |
| 7,363,257 B2 | 4/2008 | Kunz et al. |
| 7,373,669 B2 | 5/2008 | Eisen |
| 7,430,537 B2 | 9/2008 | Templeton et al. |
| 7,483,858 B2 | 1/2009 | Foran et al. |
| 7,500,607 B2 | 3/2009 | Williams |
| 7,523,067 B1 | 4/2009 | Nakajima |
| 7,545,748 B1 | 6/2009 | Riddle |
| 7,548,890 B2 | 6/2009 | Shakkarwar |
| 7,606,770 B2 | 10/2009 | Pinnell |
| 7,620,600 B2 | 11/2009 | Patil et al. |
| 7,740,168 B2 | 6/2010 | Hammad et al. |
| 7,810,165 B2 | 10/2010 | Hammad et al. |
| 7,819,322 B2 | 10/2010 | Hammad et al. |
| 2002/0007352 A1 | 1/2002 | Fieschi et al. |
| 2002/0035622 A1 | 3/2002 | Barber |
| 2002/0077978 A1 | 6/2002 | O'Leary et al. |
| 2002/0091562 A1 | 7/2002 | Siegel et al. |
| 2002/0108062 A1 | 8/2002 | Nakajima et al. |
| 2002/0133462 A1 | 9/2002 | Shteyn |
| 2003/0050896 A1 | 3/2003 | Wiederin |
| 2003/0140004 A1 | 7/2003 | O'Leary et al. |
| 2003/0154139 A1 * | 8/2003 | Woo ............................... 705/26 |
| 2003/0154406 A1 | 8/2003 | Honarvar et al. |
| 2003/0208684 A1 | 11/2003 | Camacho et al. |
| 2004/0019564 A1 | 1/2004 | Goldthwaite et al. |
| 2004/0078340 A1 | 4/2004 | Evans |
| 2004/0107170 A1 | 6/2004 | Labrou et al. |
| 2004/0171406 A1 | 9/2004 | Purk |
| 2004/0185830 A1 | 9/2004 | Joao et al. |
| 2004/0210536 A1 | 10/2004 | Gudelj et al. |
| 2005/0080730 A1 | 4/2005 | Sorrentino |
| 2005/0097320 A1 | 5/2005 | Golan et al. |
| 2005/0122209 A1 | 6/2005 | Black |
| 2005/0170814 A1 | 8/2005 | Joao et al. |
| 2005/0240527 A1 | 10/2005 | Goldman |
| 2005/0273442 A1 | 12/2005 | Bennett et al. |
| 2005/0278542 A1 | 12/2005 | Pierson et al. |
| 2006/0010072 A1 | 1/2006 | Eisen |
| 2006/0059110 A1 | 3/2006 | Madhok et al. |
| 2006/0156385 A1 | 7/2006 | Chiviendacz et al. |
| 2006/0202025 A1 | 9/2006 | Calabrese et al. |
| 2006/0281439 A1 | 12/2006 | Benco et al. |
| 2006/0282382 A1 | 12/2006 | Balasubramanian et al. |
| 2007/0006286 A1 | 1/2007 | Singhal |
| 2007/0124801 A1 | 5/2007 | Thomas |
| 2007/0143230 A1 | 6/2007 | Narainsamy et al. |
| 2007/0174448 A1 | 7/2007 | Ahuja et al. |
| 2007/0214151 A1 | 9/2007 | Thomas et al. |
| 2007/0234409 A1 | 10/2007 | Eisen |
| 2007/0239606 A1 | 10/2007 | Eisen |
| 2007/0244830 A1 | 10/2007 | Hilderman |
| 2007/0288377 A1 * | 12/2007 | Shaked ........................... 705/44 |
| 2008/0005037 A1 | 1/2008 | Hammad et al. |
| 2008/0034428 A1 | 2/2008 | Bejar et al. |
| 2008/0040276 A1 | 2/2008 | Hammad et al. |
| 2008/0046723 A1 | 2/2008 | Weber |
| 2008/0046968 A1 | 2/2008 | Cline et al. |
| 2008/0065553 A1 | 3/2008 | Faith |
| 2008/0077526 A1 | 3/2008 | Arumugam |
| 2008/0087722 A1 | 4/2008 | Collins |
| 2008/0099552 A1 * | 5/2008 | Grillion ........................ 235/380 |
| 2008/0103972 A1 | 5/2008 | Lanc |
| 2008/0103982 A1 | 5/2008 | Hammad et al. |
| 2008/0104684 A1 | 5/2008 | Lunde et al. |
| 2008/0120507 A1 | 5/2008 | Shakkarwar |
| 2008/0133420 A1 | 6/2008 | Barber |
| 2008/0154760 A1 | 6/2008 | Calabrese et al. |
| 2008/0162295 A1 * | 7/2008 | Bedier ........................... 705/26 |
| 2008/0183593 A1 | 7/2008 | Dierks |
| 2008/0189186 A1 | 8/2008 | Choi et al. |
| 2008/0208761 A1 | 8/2008 | Autry et al. |
| 2008/0244744 A1 | 10/2008 | Thomas et al. |
| 2008/0255992 A1 | 10/2008 | Lin |
| 2008/0257959 A1 | 10/2008 | Oved |
| 2008/0288384 A1 | 11/2008 | Collins et al. |
| 2008/0288405 A1 | 11/2008 | John |
| 2008/0298588 A1 | 12/2008 | Shakkarwar |
| 2008/0319869 A1 | 12/2008 | Carlson |
| 2008/0319896 A1 | 12/2008 | Carlson et al. |
| 2008/0319904 A1 | 12/2008 | Carlson et al. |
| 2009/0037213 A1 | 2/2009 | Eisen |
| 2009/0048975 A1 | 2/2009 | Felger |
| 2009/0049529 A1 | 2/2009 | Felger |
| 2009/0055315 A1 | 2/2009 | Felger |
| 2009/0083184 A1 | 3/2009 | Eisen |
| 2009/0099961 A1 * | 4/2009 | Ogilvy ........................... 705/39 |
| 2009/0204524 A1 | 8/2009 | McGeeorge |
| 2009/0271306 A1 | 10/2009 | Pierson |
| 2010/0036749 A1 | 2/2010 | Barber et al. |

FOREIGN PATENT DOCUMENTS

| | | |
|---|---|---|
| KR | 10-2004-0067372 A | 7/2004 |
| KR | 10-2006-0018792 A | 3/2006 |
| KR | 10-2006-0079290 A | 7/2006 |
| WO | WO 2008/115620 A2 | 9/2008 |

OTHER PUBLICATIONS

Google Checkout XML API Developer's Guide, 86 pages.
Google Checkout HTML API Developer's Guide, 52 pages.
PayPal™: Website Payments Standard Integration Guide, 2008, 194 pages.
PayPal™: Express Checkout Integration Guide, 2008, 70 pages.
PayPal™: Name-Value Pair API Developer Guide and Reference, 2008, 227 pages.
PayPal™: Developer Central: Custom Integration with Express Checkout, 2008, 3 pages.

* cited by examiner

SYSTEMS AND METHODS FOR SECURE AND TRANSPARENT CARDLESS TRANSACTIONS

CROSS-REFERENCES TO RELATED APPLICATIONS

The present application is a non-provisional application of and claims priority to U.S. Provisional No. 60/946,113, filed on Jun. 25, 2007 entitled "PAYMENT TRANSACTION SYSTEM AND METHOD," and to U.S. Provisional No. 61/034,904, filed on Mar. 7, 2008 entitled "SECURE CHECKOUT AND CHALLENGE SYSTEMS AND METHODS," the entire contents of which are herein incorporated by reference for all purposes.

The present provisional application is related to commonly owned and concurrently filed U.S. application Ser. No. 12/143,394, entitled "CARDLESS CHALLENGE SYSTEM AND METHOD," the entire contents of which are herein incorporated by reference for all purposes.

BACKGROUND

The present application is generally related to payment transactions, and more specifically to handling and/or authorizing payment requests by a consumer for a transaction.

Many Internet transactions are performed using credit, debit, or other type of account number. If an unauthorized person is able to obtain the account number or other information used in a transaction, the account may be compromised. The result may be unauthorized withdrawals or charges made by the unauthorized person. Most fraud occurs because of compromised merchants and acquirers who have received the account information during the transaction.

Although other systems attempt to prevent the merchant from obtaining the account number, such implementations require enrollment and extensive infrastructure changes. For example, in Google Checkout, a merchant must write new code to interface with a new entity, i.e. Google. Many additional requests and receiving of responses are added to the infrastructure of the merchant web site, e.g., via a plug-in. The merchant also needs to configure settings for the checkout, or monitor a merchant page in order to track an order. The merchant also has to cross-reference its order number with a unique identification number generated by Google. Also, the consumer needs to enroll with Google to obtain the benefit of the Google Checkout procedure. All of these and other steps require a lot of work by the merchant and consumer, and at a minimum frustrate the adoption of Google Checkout, along with the lack of other features.

Additionally, additional steps may be performed to protect a card that is compromised, stolen, or is being used without proper authorization of the cardholder. Prior methods attempt to authenticate the consumer in order to prevent security risks, such as fraud. However, such attempts have met with limited success. With the burgeoning growth of e-commerce and transactions conducted online, opportunities for payment card theft have become more readily available. As a result, online payment card fraud has also accordingly increased over the last few years. Despite many prevention efforts, payment card fraud continues to account for annual losses in the range of hundreds of millions of dollars. In addition to losses incurred due to payment card fraud, transactions lost due to false-positive declines (i.e., transactions that are incorrectly identified as fraudulent) also annually cost merchants and issuers hundreds of millions of dollars in sales.

Furthermore, existing industry solutions that combat payment card fraud tend to be account- and issuer-oriented. In other words, individual issuers may employ different solutions to detect fraudulent activities on their respective accounts and detection is at a single account level. As a result, payment card fraud that occurs across multiple accounts from multiple issuers often goes undetected. For example, it would be difficult for an individual issuer to determine that an usually high number of payment cards used at a particular merchant have been compromised and subject of fraud, since the fraud may only involve a small number of payment cards issued by that individual issuer.

Additionally, a limited time is typically allowed for an authorization to occur after a consumer has initiated the transaction, e.g., submitting a payment request via button on a web page. Thus, mechanisms that are used to authenticate the person, in order to prevent fraudulent activity, have very little time to run. Thus, only very simple mechanisms have been achieved thus far.

Better ways to perform electronic financial transactions and to authenticate consumers, particularly when the consumer is initiating a transaction over the Internet, are desirable. Embodiments of the invention address the above problems, and other problems, individually and collectively.

BRIEF SUMMARY

Embodiments of the present invention provide systems and methods for handling and/or authorizing payment requests by a consumer for a transaction. In one aspect, a consumer message including payment information is sent directly from the consumer to a non-merchant entity, such as VISA, instead of to the merchant. The consumer message advantageously may include a transaction identifier, thereby allowing tracking of the transaction between the consumer, merchant, and non-merchant, with little impact on the existing protocol for transactions between consumers and merchants. All or a portion of the payment information can also advantageously not be made available to any entity not already in possession of the payment information.

In another aspect, an application page (e.g. a checkout page) is sent from the merchant to the consumer. In response to a first payment mechanism being selected, the application page has a destination of a submit payment element on the application page directed to a server not operated by the merchant. Payment information is advantageously sent to the non-merchant when the submit payment element is activated, thereby advantageously allowing the consumer experience to be uninterrupted. The consumer may also not have to enroll in any program or create an account, which might prevent adoption of such payment mechanisms.

As used herein, the term "directly" can mean that the contents of a message are not viewed by another entity during the path between the stated sender and receiver of the message. A direct transmission via a network, such as the Internet, will probably be sent through routers on its way to the receiver from the sender; however, such a transmission is still direct. Although the message may be routed by a routing server that is part of the Internet backbone, such a server does not view the contents. Also, as used herein, the term "server" can refer to a computing system of one or more computers and network inputs and/or outputs that act as portals for a local network to a larger (wider) network, such as the Internet. Also, as used herein, the term "based on X" can mean that an analysis, result, or other determination uses X in a calculation but that other factors may also be used. Also, as used herein, the term "application page" may be a web page, a local page (e.g. a window) of an application running on a POS terminal, or any other window, screen, or page through which an application receives, sends, or displays information to a consumer, including via text messages.

Other embodiments of the invention are directed to systems, portable consumer devices, and computer readable media associated with the above-described methods.

These and other embodiments of the invention are described in further detail below with reference to the Figures and the Detailed Description.

DETAILED DESCRIPTION

Embodiments of the present invention provide systems and methods for handling and/or authorizing payment requests by a consumer for a transaction. Payment information can be sent from a consumer to a non-merchant, thereby allowing no new, trusted entities to obtain the payment information. Transaction identifiers can be used to facilitate communications among the consumer, the merchant, and a non-merchant, as well as other entities. The payment information can be sent to the non-merchant via an application served by the merchant, but which has a submit payment option directed to the non-merchant entity. Thus, little or no deviations from standard practices may be required for the merchant and consumer.

I. System and Challenge Overview

Figure 1:
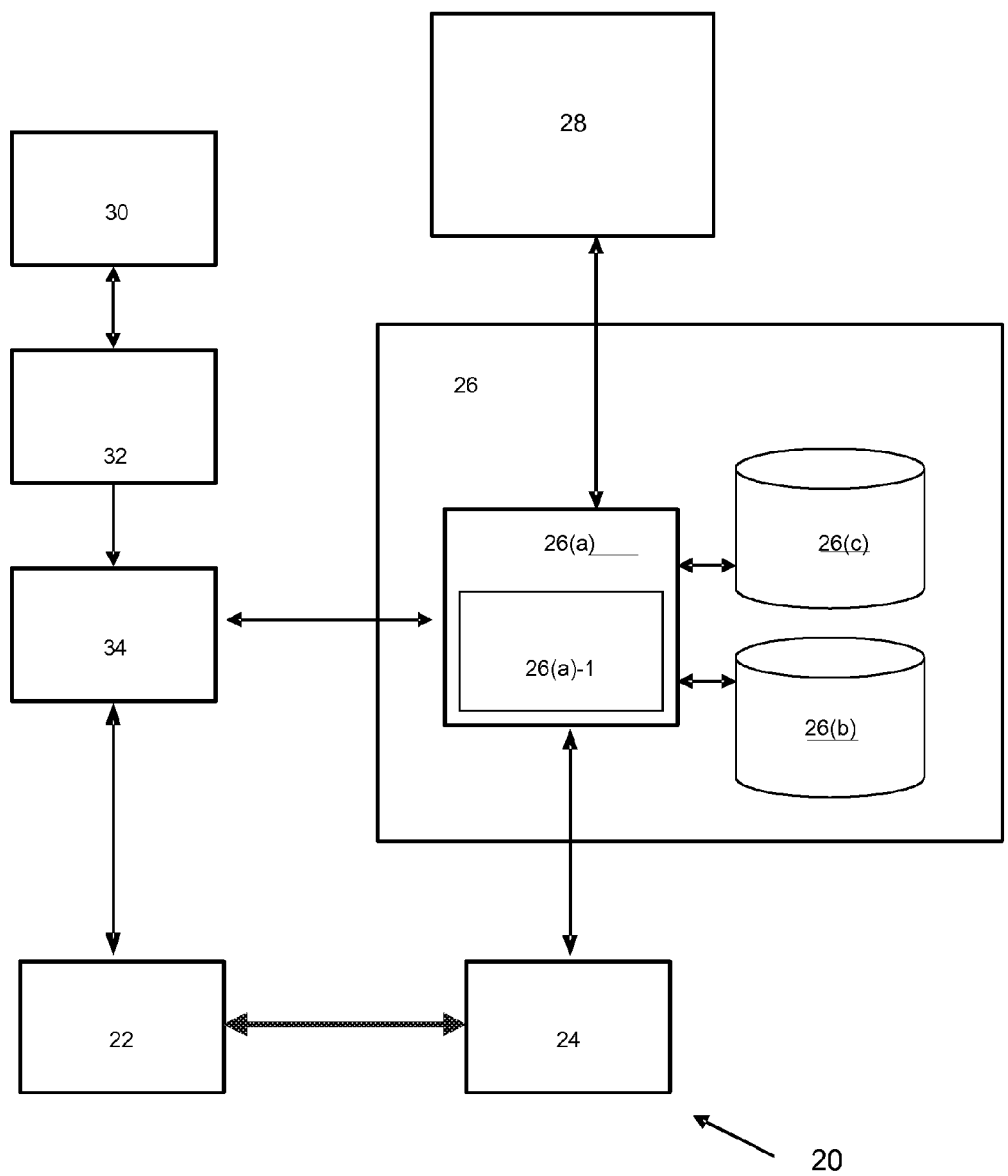
FIG. 1 shows a block diagram of a system 20 according to an embodiment of the invention.

FIG. 1 shows an exemplary system 20 according to an embodiment of the invention. Other systems according to other embodiments of the invention may include more or less components than are shown in FIG. 1.

The system 20 shown in FIG. 1 includes a merchant 22 and an acquirer 24 associated with the merchant 22. In a typical payment transaction, a consumer 30 may purchase goods or services at the merchant 22 using a portable consumer device 32. The merchant 22 could be a physical brick and mortar merchant or an e-merchant. The acquirer 24 can communicate with an issuer 28 via a payment processing network 26. The consumer may interact with the payment processing network 26 and the merchant through an access device 34, such as a point of sale (POS) terminal, personal computer, and a mobile phone. The merchant 22 may also have, or may receive communications from, an access device 34 that can interact with the portable consumer device 32, such as a debit card, credit card, smartcard, and a mobile phone.

In one aspect, communications to/from the merchant 22 are provided by one or more servers. A server may be any computer device that is connected to the communication channels provided. As used herein, the term merchant may be used interchangeably with a merchant server. Similar communications involving the acquirer and issuer may also use a server.

As shown in FIG. 1, the payment processing network 26 may comprise a server 26(a), which may comprise a challenge question engine 26(a)-1. The server 26(a) may also be in communication with a transaction history database 26(b) and a challenge question database 26(c). The challenge question engine 26(a)-1 may simply extract challenge questions from the challenge question database 26(c). Alternatively or additionally, the challenge question engine 26(a)-1 may generate challenge questions using information in the transaction history database 26(b).

The challenge questions may be static or dynamic in nature, as is described in U.S. patent application Ser. No. 11/763,240, filed on Jun. 14, 2007 entitled "CONSUMER AUTHENTICATION SYSTEM AND METHOD," which is incorporated by reference in its entirety for all purposes. For example, the challenge question engine 26(a)-1 may receive an authorization request message, for example, in response to a consumer's request to purchase goods. It may thereafter retrieve suitable questions from the challenge question database 26(c) or may generate suitable challenge questions on its own. For instance, in some cases, the challenge question engine 26(a)-1 may retrieve the question "What is your mobile phone number?" from the challenge question database 26(c) after receiving an authorization request message from a particular consumer. Alternatively, the challenge question engine 26(a)-1 may generate a dynamic question such as "Did you use this credit card at McDonald's last night?" The information pertaining to the particular restaurant that the consumer 30 was at the preceding day could be retrieved from the transaction history database 26(b).

The challenge question database 26(c) may be populated with questions of any suitable type. The questions may relate to a past location (e.g., the consumer's current home, the city that the consumer recently visited) or current location (e.g., the current location of the store that the consumer is currently at), the type or name of the merchant that the consumer is presently visiting or has visited in the past, the consumer's family or personal data (e.g., name, phone number, social security number, etc.), etc. The questions in the challenge question database 26(c) may be generated by the challenge question engine 26(a)-1 and subsequently stored in the challenge question database 26(c). As will be described later, the challenge question engine 26(a)-1 may determine whether to ask a question and which questions to ask based on device information received from the access device 34 and/or the selection of items to purchase, or type of transaction involved.

Alternatively, or additionally, the challenge questions may be generated from an external source and then subsequently stored in the challenge question database 26(c). For example, the consumer 30 may use a browser on a personal computer or the like to supply specific challenge questions to the server 26(a) via a communication medium (not shown) such as the Internet.

In some embodiments, a consumer may determine the kinds and/or quantity of challenge questions to ask himself or herself. For example, the consumer may specify that the consumer wants to be asked three challenge questions if the consumer visits a jewelry store, but only one question if the consumer visits a fast food restaurant. The types of questions posed by the consumer may be based on the merchant type, frequency of purchasing, etc. Some concepts relating to user-defined authorization parameters are described in U.S. patent application Ser. No. 10/093,002, filed on Mar. 5, 2002, which is herein incorporated by reference in its entirety for all purposes.

In preferred embodiments, the challenge questions are derived from past transaction data in the transaction history database 26(b). The consumer 30 may conduct many, many transactions with the payment processing network 26 (and/or the issuer 28) over time. This consumer transaction information may be stored in the transaction history database 26(b) over time, and challenge questions may be generated using the transaction information. The past transaction information provides a good basis for authenticating the consumer 30, since the consumer 30 will know about what transactions that the consumer 30 has conducted in the past. For example, the consumer 30 may have used his credit card to pay for a hotel room in New York the previous day, and on the next day may be asked a question such as "Did you stay at a hotel in New York yesterday?" In another example, the consumer 30 may have purchased an item that is more than $2000 the day before, and on the next day may be asked "Did you make a purchase for more than $2000 yesterday?" The questions/answers that are presented to the consumer 30 may be free form in nature and/or may include pre-formatted answers such as multiple choice or true-false answers from which the user may select.

The description below describes a process where the consumer 30 buys an item over the Internet through a personal computer, e.g. at home or at work. However, in other embodiments the consumer may use an access device at the merchant 22 to select the item, much in the same way as on the Internet. For example, a consumer 30 may obtain items and scan them in to make the selection. In one embodiment, the application page (e.g. a web page) would then already be at the access device and thus would not need to be sent. The scanning device could also communicate with a consumer's phone, where either can communicate with the merchant 22, and the payment processing network 26.

II. Secure and Convenient Transactions

Methods according to embodiments of the invention can be described with reference to FIGS. 1 and 4. In a typical purchase transaction, the consumer 30 initiates a purchase of a good or service at a merchant server 22 (e.g. through a merchant's website) using a portable consumer device 32 such as a credit card.

Figure 4:
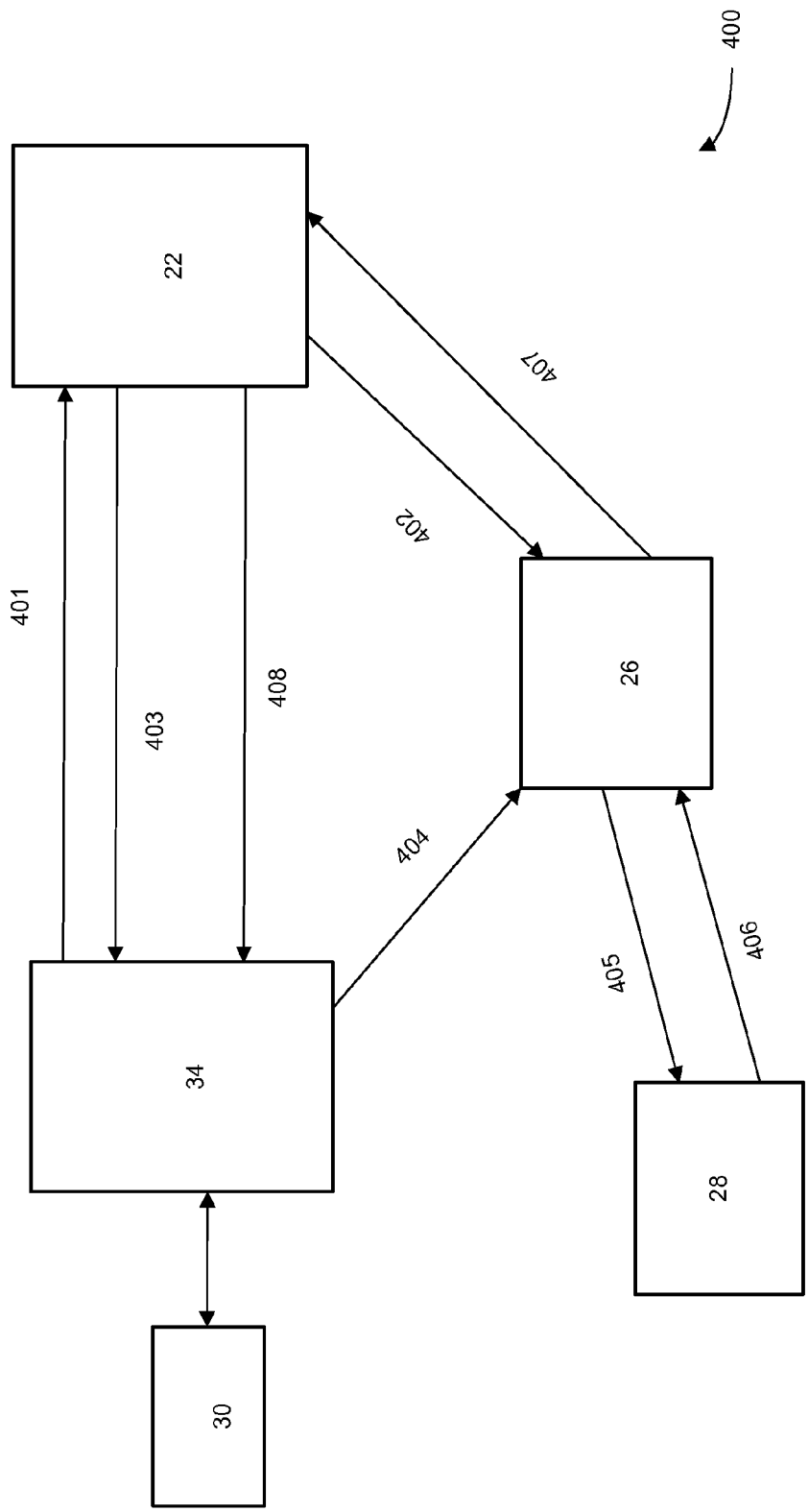
FIG. 4 shows a block diagram for a method 400 illustrating the flow of data during a transaction according to an embodiment of the present invention.

FIG. 4 shows a block diagram for a method 400 illustrating the flow of data during a transaction according to an embodiment of the present invention. In step 401, the items and the type of payment method are selected by the consumer 30. As part of a checkout request, this information is sent from the access device 34 to the merchant server 22, also referred to as the merchant. For example, the consumer 30 picks the stock-keeping unit (SKU) number of items desired. In this example, the access device 34 may be a point of sale (POS) terminal at the merchant 22.

In a pure Internet commerce transaction embodiment, the consumer 30 has selected the items on a merchant's website by placing them in a shopping basket or similar part of the merchant's website. The consumer 30 is then offered various payment options (also termed payment mechanism options herein). Then, once the consumer selects a particular payment option such as a particular credit card (e.g. VISA, MasterCard, American Express, or Discover), the above information (i.e., shopping basket information, and credit card information) is sent to the merchant 22.

In a POS (point of sale) terminal example, a consumer 30 may scan in items at a checkout kiosk. This effectively fills up a virtual shopping basket. The consumer 30 can then select a type of payment by making a selection on a display screen associated with the POS terminal. Alternatively, the consumer 30 may initiate a payment with the portable consumer device 32, for example, by swiping a card through an appropriate slot in the POS terminal. In another example, the POS terminal may be a contactless reader, and the portable consumer device 32 may be a contactless device such as a contactless card. The POS terminal can then identify the payment type and send information regarding the type of transaction to the merchant 22.

In step 402, the merchant server 22 sends transaction information to the payment processing network 26 or other non-merchant entity. The transaction information may be sent in a transaction message. In one aspect, a server of the payment processing network 26 receives the transaction information, as well as other messages and receiving other messages mentioned herein.

The transaction information includes a merchant identification (ID), an amount of the transaction, and a correlation ID, which ties together messages associated with the same transaction. The correlation ID may be the same ID that the merchant normally uses internally to track a transaction, which is advantageous, since the merchant 22 does not have to create any additional infrastructure. The merchant 22 creates a message and sends it (Method="POST") to the payment processing network 26 in a process via a communication channel that is different than the communication channel that exists between the access device 34 and the merchant 22. Optionally, information relating to the items (e.g. SKU) selected may also be sent as part of the transaction info.

Note that this step typically involves sending credit card information from the merchant 22 to the payment processing network 26. However, it is not necessary to do this at this point, particularly in embodiments where the merchant 22 does not receive the credit card information. For example, in some cases, only information related to the shopping basket is sent. This information may just be the amount of the transaction, but also may include information about the items selected, which may be used to select challenge questions as described below. For example, an item being purchased may be an item that the consumer 30 does not normally purchase and/or the merchant 22 may have a reputation for being a risky merchant (e.g., past fraud has been associated with the merchant).

In step 403, a checkout page, or other type of application page, with a mapping to the payment processing network 26 is sent to the access device 34. The page may be sent in response to the consumer 30 selecting an option to check out with the items selected in the virtual shopping cart. In one embodiment, the merchant 22 serves a checkout page to the consumer 30, where the checkout page has a "Submit Payment" button (or other mapping element) that has a destination address mapped to the payment processing network 26 The destination address can be mapped to one or many computer apparatuses in the payment processing network 26.

In step 404, payment information is sent from the access device 34 to the payment processing network 26 or other non-merchant entity. The payment information may be sent via a consumer message from the access device, which may be done by any suitable protocol. A consumer message may be any message sent from the consumer via any device used by the consumer (e.g. access device 34).

The payment information includes account information (such as the account number or other account identifier) of the consumer's account to be used for the transaction, and may include other numbers such as the credit card verification (CCV) number. In one embodiment of the invention, the payment information is obtained from the consumer entering data into the checkout page. A purpose of sending the identified consumer account is so that the account may be used as a funding source for the transaction, e.g., to buy selected items or otherwise send money to another individual or business.

In another embodiment of the invention, the payment information is obtained from the consumer 30 initiating the transaction with the portable consumer device 32, for example, at a POS terminal (acting as the access device 34). Similarly, for this transaction, the destination of the account information is the payment processing network 26. The access device 34 can be programmed to permanently erase the account information once the transaction is complete.

As the account information is advantageously not sent to the merchant 22, there is not a risk of a security breach at the merchant 22, which can cause a compromise in consumer's information (e.g., credit card information).

In one embodiment, the receiver of the account information (i.e. non-merchant, payment processing network 26) already is aware of the account information. In one aspect, the credit card is created at least partially through or in cooperation with the entity that administers or runs the payment processing network 26 (e.g. a credit card provider). For example, the payment processing network 26 may create a portion of the account identifier as a Bank Identification Number (BIN) that is associated with the issuer 28. Accordingly, during the transaction, no new entities may become aware of the account information, and the account information is held by a minimum number of entities. In another embodiment, the payment processing network 26 can perform clearing and settlement services. In yet another embodiment, the payment processing network 26 is able to send the account information directly to the issuer 28.

In step 405, an authorization request message is sent from payment processing network 26 to the issuer 28. Note that the merchant 22 does not provide an authorization request message in the example shown. In step 406, the issuer 28 responds to the authorization request, which was initiated by the payment processing network 26.

In step 407, the payment processing network 26 creates and sends a status message, which contains the correlation ID and the status of the transaction, e.g., whether or not the transaction is a success (with receipt) or failure. Accordingly, the merchant server 22 does not see the account information in this embodiment. In some embodiments, the status information may also include the transaction amount and/or items to be purchased, e.g., when the merchant 22 has not received this information yet. The status message is one type of a funding message that is sent from the payment processing network 26 to the merchant server 22. A funding message may be any message sent from a non-merchant server (such as payment processing network 26) to a merchant server 22.

Normally, in a conventional transaction, the merchant 22 would receive an authorization response from the acquirer 24, which would be in response to the merchant 22 sending an authorization request message after receiving the payment information. In the embodiment of FIG. 4, the merchant 22 still receives an authorization response message in the form of the status information. The merchant 22 has the convenience of still using this same mechanism after it has matched the correlation ID with the items selected, thus providing simple mechanisms for merchants to adopt more secure methods of conducting transactions.

In step 408, a receipt or confirmation of the transaction may be sent to the consumer 30. As shown, the receipt is sent from the merchant 22 to the consumer 30. In another embodiment, the payment processing network 26 may also send the consumer 30 the receipt.

Specific embodiments of how the payment information is directed to the payment processing network 26 will now be described.

III. Adoption of Secure Transactions

It is desirable to make it easy for merchants and consumers to adopt the secure transaction processes described herein. Unless the parties of the transaction can perform secure transactions with little or no effort on their part, the secure transaction are less likely to be adopted. If the secure transactions are not adopted, fraud cannot be reduced. Accordingly, the embodiments described herein are easy to use and are likely to be adopted.

Figure 5:
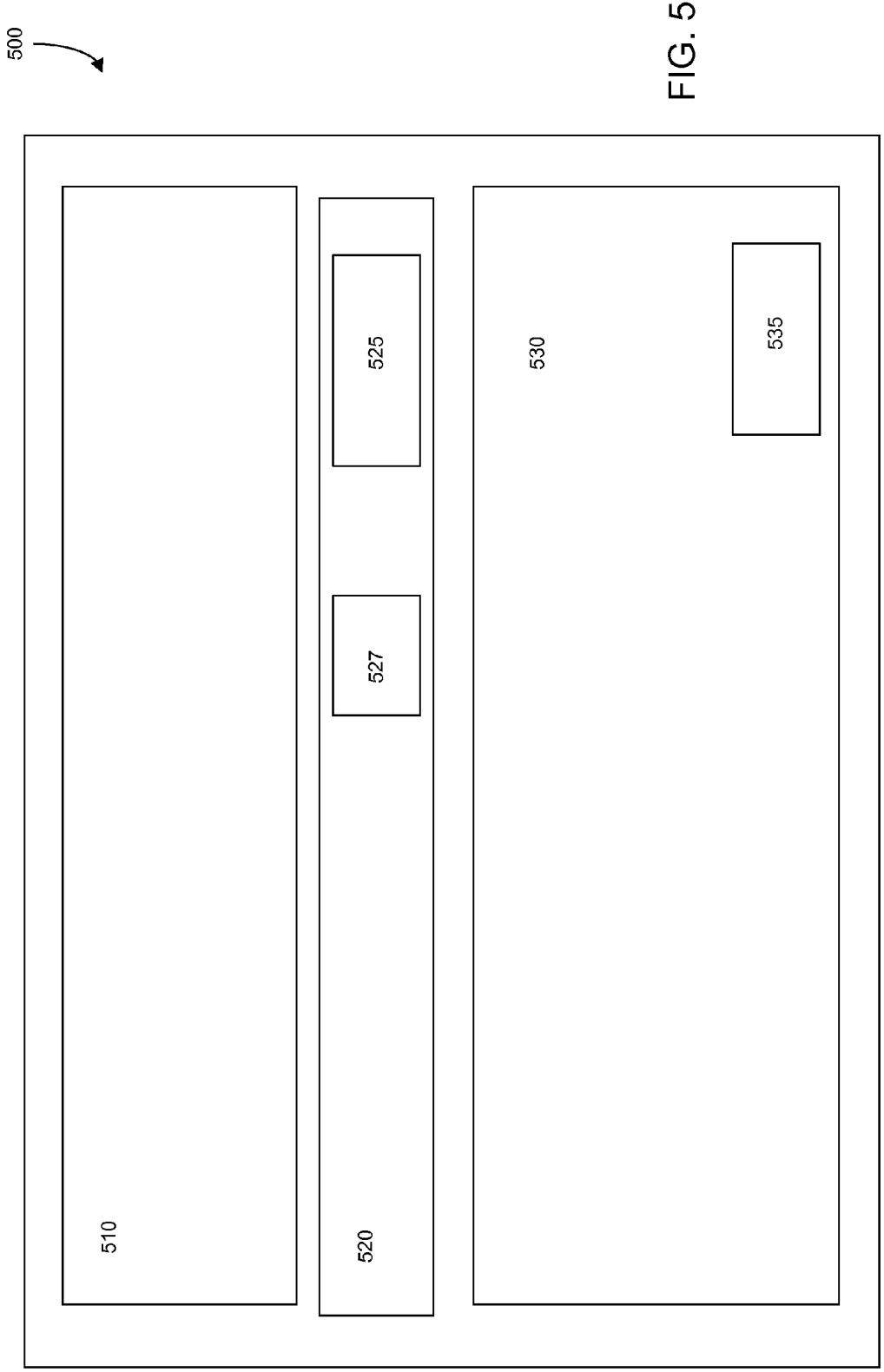
FIG. 5 shows a screen shot of a checkout page 500 according to an embodiment of the present invention.

FIG. 5 shows a screen shot of a checkout page 500 according to an embodiment of the present invention. The checkout page 500 is served to the consumer 30 (e.g., via an access device that the consumer is operating) from the merchant 22 (e.g., from a merchant's web server). This may occur after the consumer 30 has selected items and activated a general checkout button (checkout request) on the merchant's website or at the merchant's POS terminal. The information relating to the selected items may then be transferred from a previous page to page 500. Thus, page 500 may already have all or some of the items and quantity information filled in. In another example, the page is presented on a POS display and the items are shown once an item is scanned.

The frame 510 of the window 500 shows the selections made by the consumer. For example, the consumer may have chosen 1 set of Golf Clubs, 5 Golf Tees, and 1 pair of Golf Shorts. The quantity and price (individual and total) for each of the items may be displayed. The frame 520 includes options for selecting the type of payment mechanism desired, such as different types of credit/debit cards or other payment options. The payment frame 530 includes a place to input payment information, such as the name and address of the payee, the account (card) number and a credit card verification number, if applicable. The Submit Payment button 535 causes the payment information to be sent to either the merchant 22 or the payment processing network 26 depending on which payment option was selected. In one embodiment, the payment frame 530 does not appear until the payment type is selected.

When the consumer clicks on the option A 525, the shopping basket information from frame 510 is sent to the merchant 22 as described for step 401. Option A 525 may be a stand alone button as shown, or it may be chosen from a drop-down list or from some other list. When option A 525 is selected, the destination of the payment information when the submit payment button 535 is pressed is the payment processing network 26. Thus, the payment information may be sent directly to the payment processing network 26. The submit payment button 535 and the payment options 525 and 527 are payment objects of the application page.

In one embodiment, the destination of the submit payment button 535 is changed to the payment processing network 26. In another embodiment, the destination of the submit payment button 535 can start out being the payment processing network 26, and thus the destination stays the same. In yet another embodiment, the destination address has no set value and the destination is set to be the payment processing network 26.

Option A 525 may be a single option or it may be a subset of options, e.g., a subset of four different options. In one embodiment, these four options correspond to different payment mechanisms that can be processed by the payment processing network 26. For example, a set of credit cards (such as VISA and MasterCard) may be processed by payment processing network 26.

In one embodiment, the destination of the submit payment button 535 is changed by a new payment frame 530 being sent from the merchant 22 to the access device 34. The new payment frame 530 has the "Submit Payment" button 535 with a destination mapped to the network 26. This may be the only change to the frame so that as far as the consumer is concerned, the page has not changed. In another embodiment, the new payment frame 530 may have a different presentation with different fonts, locations to input the payment information, different payment information to enter, and different logos or advertising.

As to changes that are needed to be implemented by the merchant 22, the option A button can have functionality for sending the shopping basket information of frame 510 to the merchant 22. Also, the merchant 22 can have the destination of submit payment 535 changed. The change may be done by sending over a new piece of HTML or other code, or having the destination change dynamically based on code originally sent with the page, when the checkout process was initiated by the consumer 30.

In one embodiment, the new payment frame 530 is sent by the merchant 22 as an IFrame (an HTML element) that points to a location within the payment processing network 26, and the payment frame 530 is served from the payment processing network 26. In this case, the new payment frame 530 is sent from payment processing network 26. For example, once the IFrame is received by the access device 34, it then submits a request to the payment processing network 26 for the display information for the Iframe.

Advantageously, the consumer 30 does not have to enroll into a program or create an account to conduct secure transactions. As noted above, payment information can be sent automatically to the payment processing network 26, even though the consumer 30 does not supply a username and/or password. A secure checkout is automatically performed when the payment option 525 is chosen. Accordingly, it is likely that consumers will adopt embodiments of the invention, since it is easy and convenient to use.

In one embodiment of the invention, as far as the consumer 30 knows, the payment information is still sent to the merchant 22. Thus, this step can be transparent to the consumer. For example, the URL in the browser that is used by the consumer would not change and the rest of the page also would not change. In other words, the change in the destination of the submit payment button 535 can be hidden from the consumer 30, so that the consumer's shopping experience is the same as it has been in the past.

When the consumer 30 selects other options 527, then the transaction may proceed as normal. For example, the destination of the submit payment button 535 would still be directed to the merchant 22. An authorization request message would be sent from the merchant 22, to the payment processing network 26, and back to the issuer 28 in some embodiments. Also, the virtual shopping basket information may not be sent to the merchant 22 when the button 527 is activated, but the virtual shopping basket information may be sent when the submit payment button 535 is pressed.

As mentioned above, the change or selection of the destination of the "submit payment" button 535 may be performed with code sent to the access device 34 operated by the consumer 30 in the initial serving of the page 500. Also, the transmission of the transaction information may be different from method 400.

Figure 6:
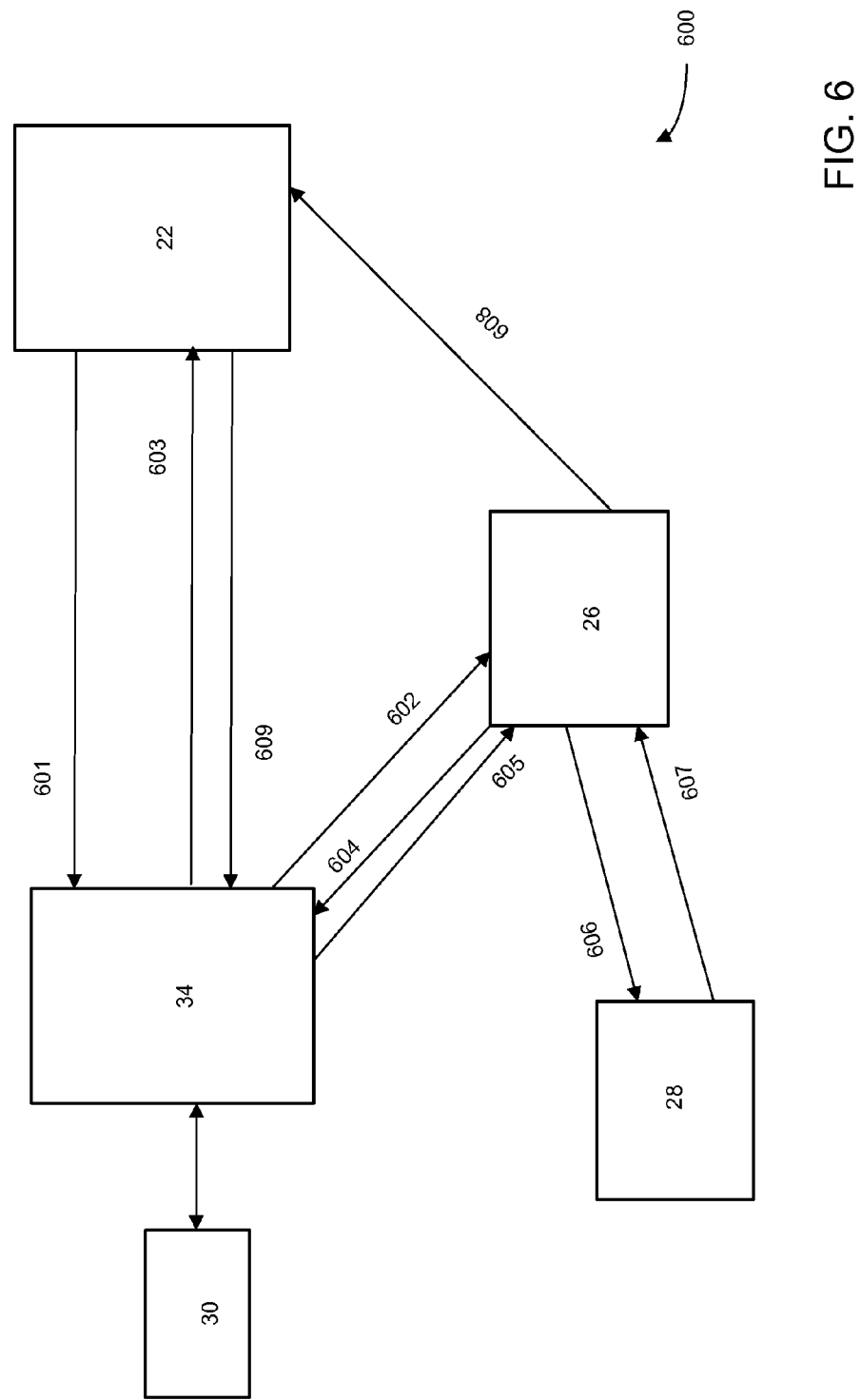
FIG. 6 shows a block diagram of a method 600 illustrating the flow of data during a transaction where transaction information is sent from the access device to the payment processing network 26 according to another embodiment of the present invention.

FIG. 6 shows a block diagram of a method 600 illustrating the flow of data during a transaction where transaction information is sent from the access device 34 to the non-merchant, payment processing network 26 according to another embodiment of the present invention. Method 600 shows other embodiments where the initial checkout page 500 includes code for sending payment information to the network 26 when the option A 525 is chosen and/or where the transaction information is sent from the access device 34 to the payment processing network 26, as opposed to being sent from the merchant 22 to the payment processing network 26.

In step 601, a checkout page (e.g. page 500) is served from the merchant 22 to the access device 34 operated by the consumer 30. The checkout page 500 may have a place for the consumer 30 to select the items or may already have all or some of the item and quantity information filled in, which may be transferred from a previous page. In one embodiment, this checkout page 500 includes logic to select among a plurality of destinations for the payment information to be sent once a submit payment element (e.g. 535) is activated. The selection is based on the payment type selected. This may be done with IF statements, a CASE statement, or similar logic.

In one embodiment of the invention, the payment option A 525 has a destination mapped to the payment processing network 26. Thus, in step 602 at least some of the transaction information is sent to the payment processing network 26 (without first being sent to the merchant 22) when payment option 525 is selected (e.g., clicked). This transaction information includes at least the amount of the transaction, and a merchant ID or merchant identifier. The transaction information may also include a transaction or correlation ID, which was sent by the merchant 22 in page 500 or that was created at the access device 34, e.g., by code embedded in page 500. If the correlation ID is created at the access device 34, then the correlation ID may be sent from the access device 34 to the merchant 22, e.g. in step 603 or in another step.

The payment option A 525 may also have a destination mapped to the merchant server 22 so that the same transaction information is also sent to the merchant server 22 in an optional step 603. If this information is sent to the merchant 525, the payment frame may be served from the merchant 22 as described in FIG. 4. The payment frame may be of a universal type or the merchant can specify one that is designed to it (e.g. includes branding that it desires). Alternatively, the payment processing network 26 can provide its own branding.

In the embodiment shown in FIG. 6, the web page 500 already includes the IFrame to retrieve the payment page 530 from the network 26. Once the option 525 is chosen, the code in the checkout page 500 automatically knows to obtain a new payment frame 530 from the payment processing network 26.

Thus, in step 604, the payment frame is sent from the payment processing network 26 to the access device 34. This payment frame has a "Submit Payment" element (e.g. 535) directed to the network 26.

Accordingly, in one embodiment, information regarding the payment type is not received by the merchant 22. The page sent to the consumer via the access device 34 when a general checkout is requested may already have a mapping of the submit payment element to payment processing network 22 even though the consumer has not selected the form of payment yet. Once the consumer 30 has selected the payment option A, the link to the payment processing network 26 is established using the mapping that has already been sent. In one aspect, information indicating that the payment network 26 was chosen is sent to the merchant 22.

The rest of the steps of method 600 may be performed as the comparable steps in method 400, or as described herein. For example, step 606 can send an authorization request to issuer 28; step 607 can send back the authorization response from the issuer 28; and step 608 can send the status information to merchant 22.

In one embodiment, the status information sent in step 608 can include the amount of the transaction and the items selected as the merchant 22 may not be aware of this information if step 603 is not performed. In step 609, a receipt or confirmation of the transaction may be sent to the consumer 30.

In one embodiment, an entity associated with the payment processing network 26 can incentivize the use of embodiments of the invention by providing a discount in a fee charged to the merchant 22 if the merchant 22 uses embodiments of the invention.

IV. Complex Challenges and Risk Analysis

The ability of payment processing network 26 to obtain payment information from the access device 34 and not from the merchant 22 allows challenges to be presented from the payment processing network 26 to the consumer and the types of challenges can be more complex than those previously available. For instance, more time can be made available for challenges, thus allowing more challenges and more specific and complex questions.

Figure 7:
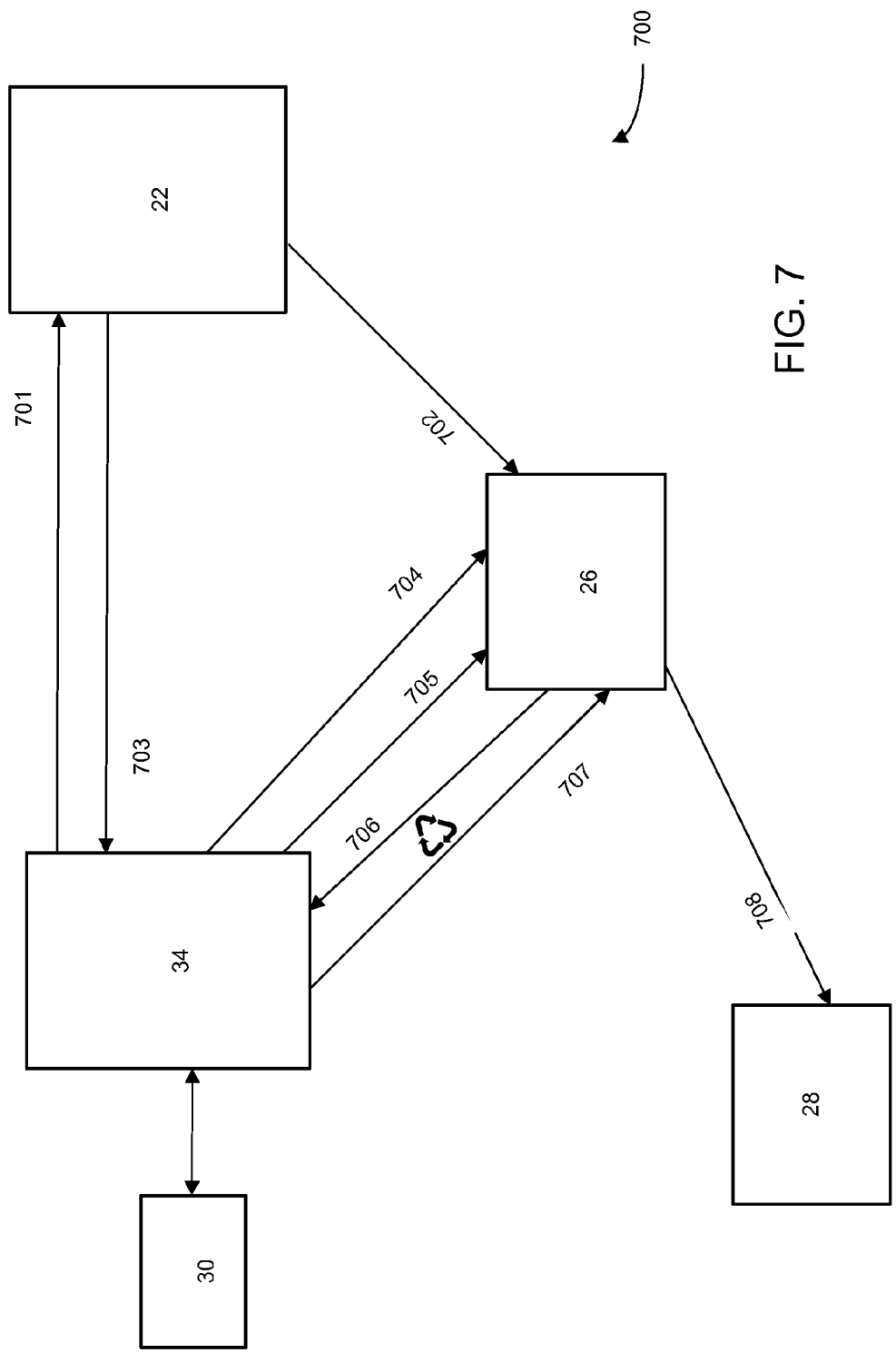
FIG. 7 shows a block diagram for a method 700 illustrating the flow of data during a transaction where challenges are presented to the consumer according to an embodiment of the present invention.

FIG. 7 shows a block diagram for a method 700 illustrating the flow of data during a transaction where challenges are presented to the consumer according to an embodiment of the present invention. Method 700 presents a process flow similar to method 400 for the first few steps. However, in other embodiments, the first few steps may be similar to that of method 600 or other methods described herein.

In step 701, the items selected by the consumer 30 and the type of payment method are sent from the access device 34 to the merchant server 22. In step 702, the merchant server 22 sends the transaction information to the payment processing network 26 or other non-merchant entity. In one embodiment, the transaction information includes a merchant identification (ID), an amount of the transaction, and a correlation ID, which ties together messages associated with the same transaction. As mentioned above, the payment information may also be sent from the access device 34 directly to the payment processing network 26.

In step 703, a checkout page with a mapping to the payment processing network 26 is sent to the access device 34. This page may be sent in response to the consumer 30 selecting an option to checkout (e.g. a checkout request) with the items selected in the shopping cart. In one embodiment, the merchant 22 serves a checkout page to the consumer, where the checkout page has a "Submit Payment" button that has a destination address mapped to one or more computer apparatuses (e.g. servers) in the payment processing network 26.

In step 704, device information may be obtained. In one embodiment, this occurs before the account information is sent. Device information may include an IP address for the access device 34, an operating system of the access device 34, a private value (such as a hash or other encrypted value) resulting from code running on the access device 34, or any other type of information correlated to a computing device. In one embodiment, the merchant 22 serves a checkout page to the consumer 30, where the checkout page has a "Submit Payment" button mapped to the payment processing network 26, and renders an Iframe for device information collection, with a correlation ID reference. This is discussed in more detail below. In one aspect, when the payment processing network 26 is chosen, the device information is sent and also then the items and amount are sent, either by the merchant 22 or the consumer 30.

In one embodiment, the device information is saved in a database or other storage device accessible to the payment processing network 26. The device information can be stored associated with a particular consumer and/or a particular consumer account. In this manner, the device information for a current transaction can be compared to the device information for previous transaction, which can be used in calculating a risk score as described herein. The database of device information may also include information based on the items that the person has purchased. The information in the database may then be used to deliver an offer to the consumer. For example, if a computer (access device) is known to be of a certain age and the location of the computer is known to be near a particular store, a coupon for that store (possibly targeted specifically for computers) may be sent to the consumer via post mail, e-mail, or mobile application (such as SMS or MMS).

In one embodiment, a merchant ID and the correlation ID are sent when the device information is sent. In one aspect, a specific device server is used in the collection that is different from the server used to verify the transaction.

The device information may also include a user unique ID (UUID), which is not the account number. The device server may also request DNA/pebbles through the user's browser based on the UUID. The device server can then push results to the application tier. The device information may be filed in a local flat activity in, e.g., an XML format.

The use of IFrames allows the device collection to work transparently and to not be compromised by browser controls, such as pop up blockers. In one embodiment, if the device server is not available then a "function not available" message is sent to the application server so that the transaction is not disrupted, thus allowing the user's experience to always be seamless.

In step 705, payment information is sent from the access device 34 to the payment processing network 26 or other non-merchant entity. The payment information includes the account number of the consumer, and may include other numbers such as the credit card verification (CCV) number. As mentioned above, the access device 34 may be a personal computing device (e.g. computer, phone, PDA, etc.) of the consumer 30, or the access device 34 may be associated with a retail establishment, such as a POS terminal.

The payment processing network 26 may use the device information or the transaction information to initiate a risk analysis of the transaction. For example, if the IP address is not in the country, then the transaction would be riskier, or if it is an IP address never used before, e.g., not your home or work computer. Mechanisms may also determine whether an IP address is being spoofed.

Initiating a risk analysis can refer to the start of a risk analysis, parts of which may be partially performed by another entity, or actual performance of the risk analysis.

Also, if an item, the items taken as a whole, or the amount are unusual for the consumer 30 to purchase, then the transaction may be characterized as risky. Past transaction information may be used to determine whether or not an item is an unusual purchase for the consumer 30. Other information may also be used, such as the person's age, location of residence, or other information. For example, if the consumer 30 is 75 years old and purchased a hang glider, then the transaction might be characterized as risky.

A risk score that represents an account level risk associated with the corresponding transaction may be calculated from any of the information above. Additional discussion for the calculation of a risk score can be found in U.S. Pat. No. 6,658,393 and U.S. patent application Ser. No. 10/863,813, entitled "Method and System for Providing Risk Information in Connection With Transaction Processing" by Bruesewitz et al. A transaction with a high initial risk score compared to a threshold criteria may be supplemented via challenge questions submitted to the consumer.

In step 706, a challenge message is sent to the consumer 30. For example, when the device, item, consumer info, or other information suggests that the transaction being conducted is risky, then challenge questions may be presented in order to increase the security. The messages may be in the form of challenge questions. Examples of challenge questions may include questions about the consumer's zip code, mother's maiden name, or more specific questions such as past purchases, etc.

The challenges may be sent to the access device 34 from which the account information was received, or it may be another device associated with the consumer, e.g., the consumer's mobile phone when it is not used as the access device 34. In one embodiment, a code is sent to the consumer's mobile phone, and the challenge question requests an input of the code. In one aspect, the code may be redeemable for a discount on the current transaction or a future transaction. This code may be sent before the payment mechanism is shown, thus incentivizing use of a payment mechanism that is compatible (processable) by the network 26 (e.g. option A 525).

In step 707, the consumer responds to the challenge question, e.g. providing a challenge answer. The process of sending challenge questions and receiving challenge answers may be repeated.

After the challenge response has been validated as being correct or incorrect, a risk score may be provided to the issuer 28 for use in determining whether to authorize the transaction. The risk score may account for correctness of the challenge response, the place of purchase, the history of the card, the amount of the purchase, or any combination of the other criteria mentioned herein. Thus, if an incorrect response is provided, the transaction is not necessarily denied. Also, more than one challenge can be used. If two challenges are used and the response to both are wrong, then there would be a greater chance that person would be turned down, i.e. a greater risk score. If one is wrong and the other right, then the total contribution to the risk score from the challenges may be zero or dependent on the confidence score (see below) of each challenge. One skilled in the art will appreciate the different contributions arising from multiple challenge questions.

Some challenge questions may be more reliable (confidence score) than other ones. The more reliable challenge questions may affect the risk score more. Thus, a more accurate and efficient risk score may be achieved. In one aspect, the confidence score may be used as a weighting in determining the overall risk score, or similarly whether the user is considered to be authenticated.

In one embodiment, the limited time for the authorization to occur after a consumer has initiated the transaction, e.g., submitting a payment request via button on a web page, does not begin until the authorization request is sent to the issuer 28. Thus, as many challenge questions may be presented as desired. Thus, more complicated mechanisms may be achieved.

In step 708, the authorization request message is sent from the payment processing network 26 to the issuer 28. Additional steps may be performed as in methods 400 or 600, or other methods described herein. The presentation of the challenge questions can be made to integrate with the checkout page presented to the consumer 30, as described in the embodiment below.

Figure 8:
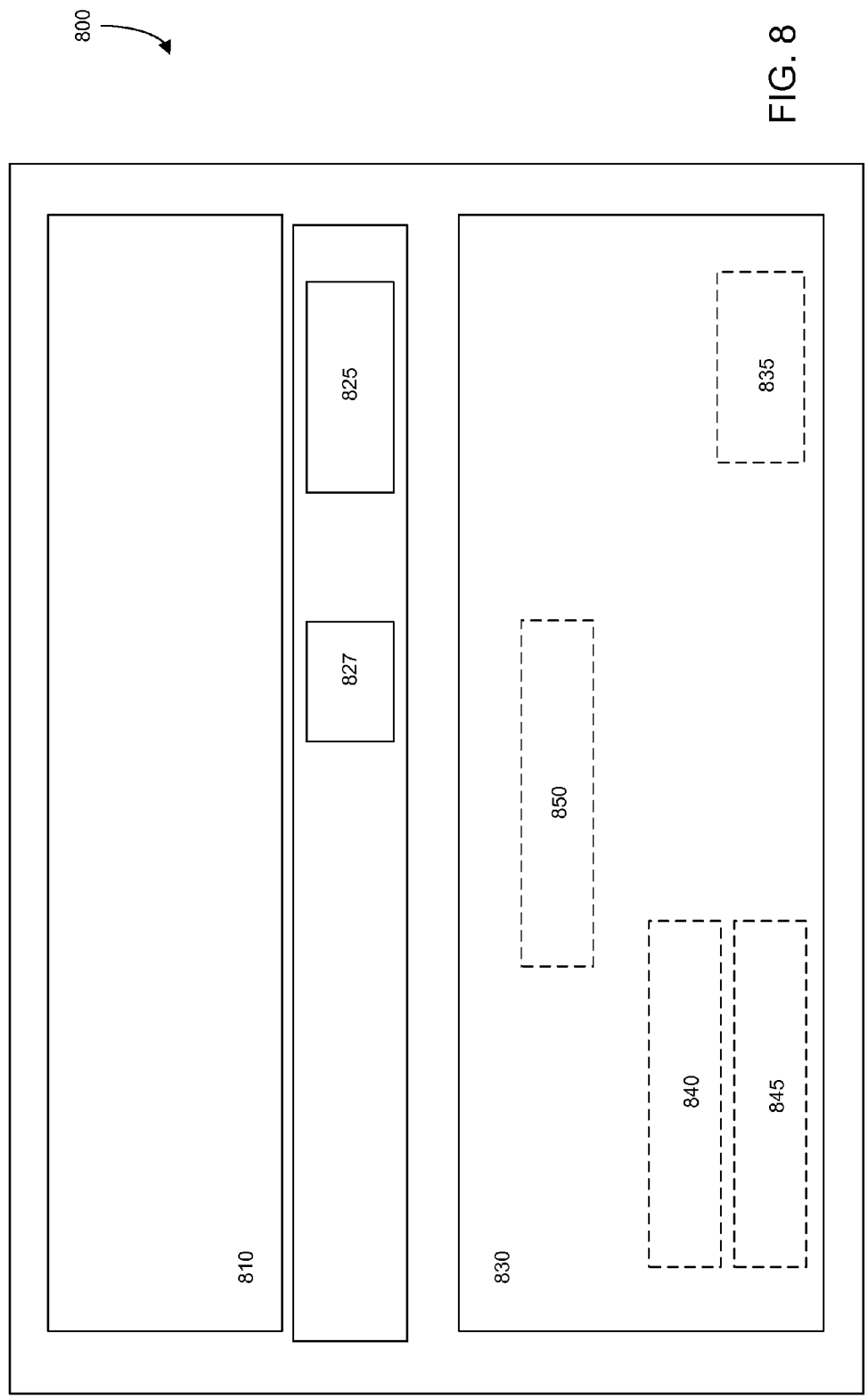
FIG. 8 shows a screen shot of a checkout page 800 used for presenting challenge questions to a consumer according to an embodiment of the present invention.

FIG. 8 shows a screen shot of a checkout page 800 used for presenting challenge questions to a consumer according to an embodiment of the present invention. In one embodiment, checkout page 800, or other type of application page, has a similar layout compared to the checkout page 500. The items 810-827 may have the same functionality as the corresponding items of checkout page 500. Option A 825 may also have enhanced functionality.

In one embodiment, embedded software, such as a hidden frame, is included in the checkout page 800 when it is sent to the consumer. This code may be used to initiate the device information collection process. The code may be directly included in the page 800 or a link to the code may be included. An exemplary line of a link to the code sent from the merchant 22 to the access device 34 is <iframe src='http://www.ivisa.com/zfp_visa/php? Merchid=2000$corrid=123' height=1 width=1 frameborder=0 scrolling=no></iframe>. The device information may be sent at anytime after the page 800 is served to the consumer. For example, it may be immediately after the page is served, i.e. before the Option A 825 is activated. In another embodiment, the device information is sent to the network 26 after the option A 825 is activated, which selects the preferred payment processing network 26, or payment processing organization (e.g., Visa).

Also, after the option A 825 is chosen, the network-specific frame 830, which may use an IFrame, is presented to the consumer 30. The submit payment button 835 has a destination address linked to the payment processing network 26. After the submit payment button 835 is activated, a challenge question 840 may appear, along with a text box 845 for entering an answer to the challenge question 840. After any of these buttons or boxes are activated, they may disappear, as signified by the dotted lines. The challenge questions and answers may be used to determine or alter a risk score as defined above. In one embodiment, the incorrect answers may be used to immediately deny the transaction.

The frame 830 may also be used to provide the feedback of whether the transaction is approved or not, e.g., via a box 850.

The device information may also include information as to the type of browser being used. This information may be used to determine how to provide the frame 830 and the challenge questions. For example, by knowing the browser capabilities, the code may be served in a manner that is easily displayable and functional with the browser of the consumer. For example, different code may be used based on whether or not the access device is using a browser of a mobile phone.

V. Additional Process Flows

In some embodiments, the organization and processing of the authorization may differ from the embodiments presented above. The payment processing network 26 does not always send an authorization request message to the issuer 28. For example, after the payment processing network 26 has received the payment information, e.g. in step 404, or after the payment processing network 26 has finishes the challenge process, e.g. after step 707, the payment processing network 26 can send some type of payment information to the merchant, a merchant acquirer, or a general use acquirer.

Figure 9:
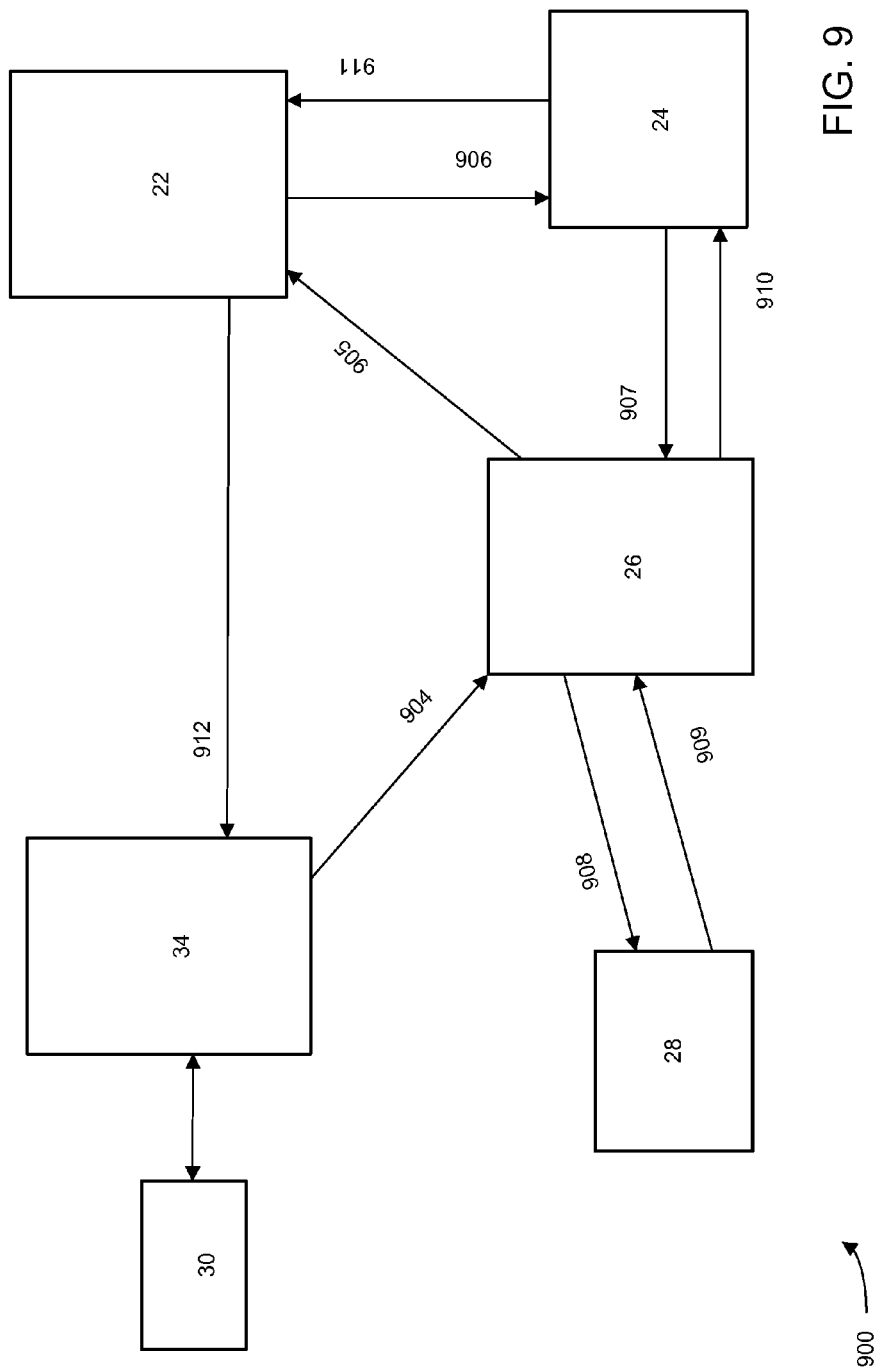
FIG. 9 shows a block diagram for a method 900 illustrating the flow of data during a transaction where a type of payment information is sent to the merchant 22 from the payment processing network 26 according to an embodiment of the present invention.

FIG. 9 shows a block diagram for a method 900 illustrating the flow of data during a transaction where a type of payment information is sent to the merchant 22 from the payment processing network 26 according to an embodiment of the present invention. Steps before step 904 may occur as described herein.

In step 904, payment information is sent from the access device 34 to the payment processing network 26 or other non-merchant entity. The payment processing network 26 may initiate a challenge process with the consumer 30, continue with a risk analysis, or perform other steps as described herein or known to one skilled in the art. In one embodiment, the payment information includes an account identifier for the account to be used for the transaction.

In step 905, payment information is sent from the payment processing network 26 (e.g. a server of a non-merchant entity) to the merchant 22. The payment information may be sent as one type of a funding message that is sent from the payment processing network 26 to the merchant 22.

In one embodiment, the information sent in this step may include a same account identifier as received in step 904 or it may include a different payment identifier. For example, the payment processing network 26 can create a new or artificial PAN (primary account number) or code from any symbols (possibly at random) and can associate that number with the credit card number received in step 904. The new number may be of the same size (e.g. # of characters) as the actual PAN.

In this manner, the merchant 22 still does not receive the actual credit card number of the consumer. The new number may also only be associated with the credit card number for a limited time (i.e. temporary), thus preventing that number to be used again. In one embodiment, the new number can have a prefix or other part that signifies that it is not a real card number but an artificial one created for the purpose above.

In step 906, the merchant 22 sends a first authorization request message to the acquirer 24. In step 907, after the acquirer 24 receives the first authorization request message, the first authorization request message is then sent to the payment processing network 26. At this point, the payment processing network 26 can match the new number with the actual account number of the customer.

In step 907, the payment processing network 26 then, if necessary, forwards the authorization request message with the account number and amount to the issuer 28 (step 908). This step is not necessary, e.g., when the payment processing network 26 is also the issuer of the consumer account.

In step 909, the issuer 28 responds to the authorization request message. For example, the issuer 28 may accept the transaction or decline the transaction, or may refer the transaction. In step 910, the payment processing network 26 forwards the authorization response to the acquirer 24, which then forwards the authorization results (step 911). Finally a receipt may be sent to the consumer (step 912).

Figure 10:
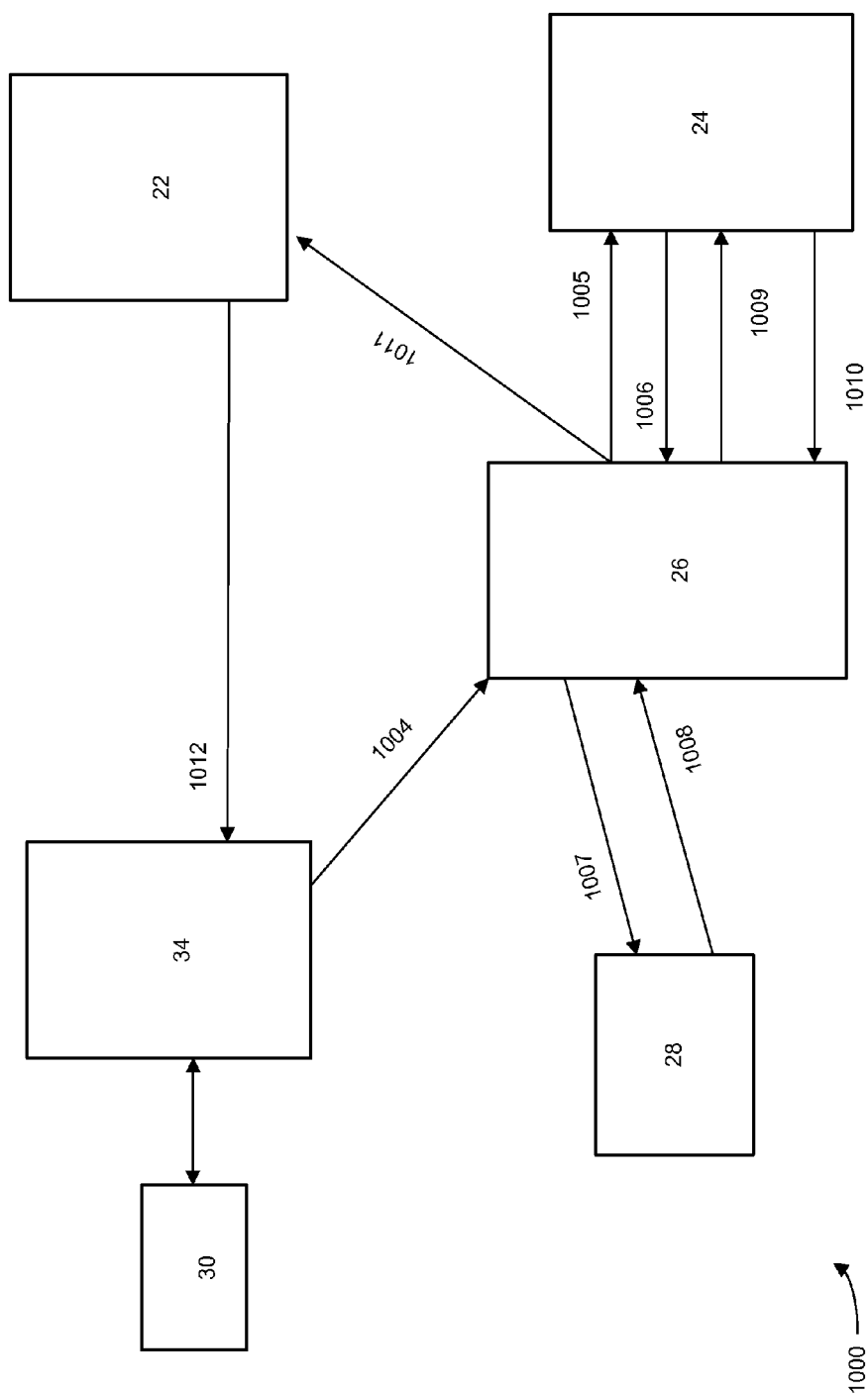
FIG. 10 shows a block diagram for a method 1000 illustrating the flow of data during a transaction where a type of payment information is sent to an acquirer 24 from the payment processing network 26 according to an embodiment of the present invention.

FIG. 10 shows a block diagram for a method 1000 illustrating the flow of data during a transaction where a type of payment information is sent to an acquirer 24 from the payment processing network 26 according to an embodiment of the present invention. Steps before step 1004 may occur as described herein.

In step 1004, payment information is sent from the access device 34 to the payment processing network 26 or other non-merchant entity. The payment processing network 26 may then perform a challenge process with the consumer 30, continue with a risk analysis, or perform other steps as described herein or known to one skilled in the art.

In step 1005, payment information is sent from the payment processing network 26 (e.g. a server of a non-merchant entity) to an acquirer 24. In one embodiment, the information sent in this step may include a same account identifier as received in step 904 or it may include a different payment identifier as described above. In one embodiment, acquirer 24 may be an acquirer chosen or associated with the merchant 22, and thus each merchant may have a different acquirer. In another embodiment, the payment processing network 26 may use the same acquirer 24 for all transactions, or at least the same acquirer for a group of merchants.

In step 1006, the acquirer 24 sends a first authorization request message to the network 26. At this point, a server computer in the payment processing network 26 can match the new number with the actual account number of the customer.

In step 1007, the payment processing network 26 then, if necessary, forwards the authorization request message with the account number and amount to the issuer 28 (step 908). This step is not necessary, e.g., when the payment processing network 26 is also the issuer of the consumer account.

In step 1008, the issuer 28 responds to the authorization request message. For example, the issuer 28 may accept the transaction or decline the transaction, or may refer the transaction. In step 1009, the payment processing network 26 forwards the authorization response message to the acquirer 24, which then responds with the authorization results to the network 26 (step 1010). In step 1011, the payment processing network 26 can then send status information to the merchant 22 as in step 407. Finally a receipt may be sent to the consumer from the merchant 22 (step 1012). Alternatively, the payment processing network 26 can send the receipt to the consumer 30, e.g., in parallel with status information sent to the merchant 22.

VI. Various Embodiments

As used herein, an "acquirer" is typically a business entity, e.g., a commercial bank that has a business relationship with a particular merchant or an ATM. An "issuer" is typically a business entity (e.g., a bank) which issues a portable consumer device such as a credit or debit card to a consumer. Some entities can perform both issuer and acquirer functions. Embodiments of the invention encompass such single entity issuer-acquirers.

The consumer 30 may be an individual, or an organization such as a business that is capable of purchasing goods or services. In other embodiments, the consumer 30 may simply be a person who wants to conduct some other type of transaction such as a money transfer transaction or a transaction at an ATM.

The portable consumer device 32 may be in any suitable form. For example, suitable portable consumer devices can be hand-held and compact so that they can fit into a consumer's wallet and/or pocket (e.g., pocket-sized). They may include smart cards, ordinary credit or debit cards (with a magnetic strip and without a microprocessor), keychain devices (such as the Speedpass™ commercially available from Exxon-Mobil Corp.), etc. Other examples of portable consumer devices include cellular phones, personal digital assistants (PDAs), pagers, payment cards, security cards, access cards, smart media, transponders, and the like. The portable consumer devices can also be debit devices (e.g., a debit card), credit devices (e.g., a credit card), or stored value devices (e.g., a stored value card).

The access devices 34 according to embodiments of the invention can be in any suitable form. Examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like.

If the access device 34 is a point of sale terminal, any suitable point of sale terminal may be used including card readers. The card readers may include any suitable contact or contactless mode of operation. For example, exemplary card readers can include RF (radio frequency) antennas, magnetic stripe readers, etc. to interact with the portable consumer devices 32.

The access device 34 may also be a wireless phone. In one embodiment, the portable consumer device 32 and the access device are the same device. For example, a consumer may use a wireless to phone to select items to buy through a browser.

When the access device 34 is a personal computer, the interaction of the portable consumer devices 32 may be achieved via the consumer 30 or another person entering the credit card information into an application (e.g. a browser) that was opened to purchase goods or services and that connects to a server of the merchant, e.g. through a web site. In one embodiment, the personal computer may be at a checkout stand of a retail store of the merchant, and the application may already be connected to the merchant server.

Figure 2:
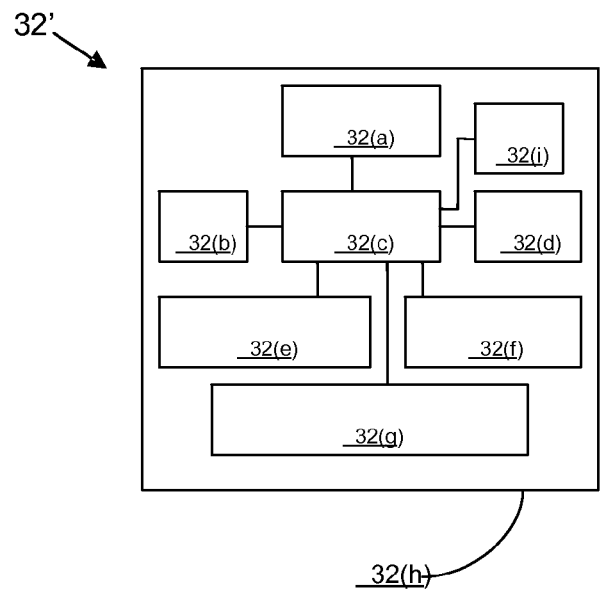
FIG. 2 shows a block diagram of one type of portable consumer device.

An exemplary portable consumer device 32' in the form of a phone may comprise a computer readable medium and a body as shown in FIG. 2. (FIG. 2 shows a number of components, and the portable consumer devices according to embodiments of the invention may comprise any suitable combination or subset of such components.) The computer readable medium 32(b) may be present within the body 32(h), or may be detachable from it. The body 32(h) may be in the form a plastic substrate, housing, or other structure. The computer readable medium 32(b) may be a memory that stores data and may be in any suitable form including a magnetic stripe, a memory chip, etc. The memory preferably stores information such as financial information, transit information (e.g., as in a subway or train pass), access information (e.g., as in access badges), etc. Financial information may include information such as bank account information, bank identification number (BIN), credit or debit card number information, account balance information, expiration date, consumer information such as name, date of birth, etc. Any of this information may be transmitted by the portable consumer device 32.

Information in the memory may also be in the form of data tracks that are traditionally associated with credits cards. Such tracks include Track 1 and Track 2. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks must abide by it. It contains the cardholder's account, encrypted PIN data, plus other discretionary data.

The portable consumer device 32 may further include a contactless element 32(g), which is typically implemented in the form of a semiconductor chip (or other data storage element) with an associated wireless transfer (e.g., data transmission) element, such as an antenna. Contactless element 32(g) is associated with (e.g., embedded within) portable consumer device 32 and data or control instructions transmitted via a cellular network may be applied to contactless element 32(g) by means of a contactless element interface (not shown). The contactless element interface functions to permit the exchange of data and/or control instructions between the mobile device circuitry (and hence the cellular network) and an optional contactless element 32(g).

Contactless element 32(g) is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the portable consumer device 32 and an interrogation device. Thus, the portable consumer device 32 is capable of communicating and transferring data and/or control instructions via both cellular network and near field communications capability.

The portable consumer device 32 may also include a processor 32(c) (e.g., a microprocessor) for processing the functions of the portable consumer device 32 and a display 32(d) to allow a consumer to see phone numbers and other information and messages. The portable consumer device 32 may further include input elements 32(e) to allow a consumer to input information into the device, a speaker 32(f) to allow the consumer to hear voice communication, music, etc., and a microphone 32(i) to allow the consumer to transmit her voice through the portable consumer device 32. The portable consumer device 32 may also include an antenna 32(a) for wireless data transfer (e.g., data transmission).

If the portable consumer device is in the form of a debit, credit, or smartcard, the portable consumer device may also optionally have features such as magnetic strips. Such devices can operate in either a contact or contactless mode.

Figure 3:
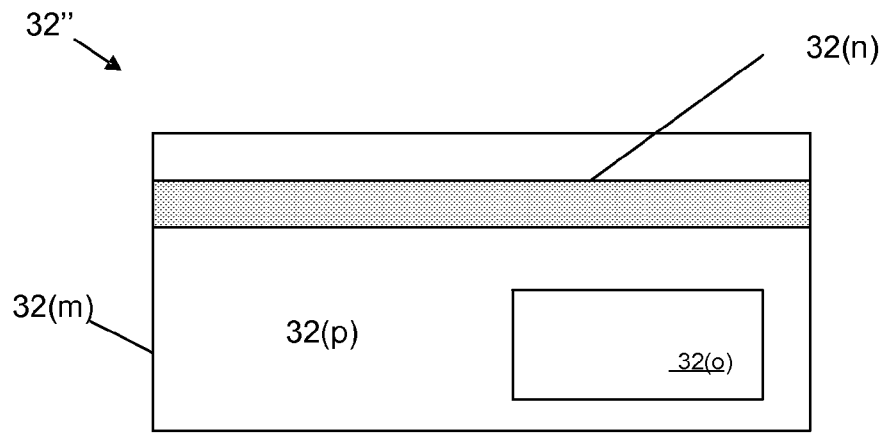
FIG. 3 shows a plan view of a second type of portable consumer device.

An example of a portable consumer device 32" in the form of a card is shown in FIG. 3. FIG. 3 shows a plastic substrate 32(m). A contactless element 32(o) for interfacing with an access device 34 may be present on or embedded within the plastic substrate 32(m). Consumer information 32(p) such as an account number, expiration date, and consumer name may be printed or embossed on the card. Also, a magnetic stripe 32(n) may also be on the plastic substrate 32(m).

As shown in FIG. 3, the portable consumer device 32" may include both a magnetic stripe 32(n) and a contactless element 32(o). In other embodiments, both the magnetic stripe 32(n) and the contactless element 32(o) may be in the portable consumer device 32". In other embodiments, either the magnetic stripe 32(n) or the contactless element 32(o) may be present in the portable consumer device 32".

The payment processing network 26 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing network 26 may include a server computer. A server computer is typically a powerful computer or cluster of computers. For example, the server computer can be a large mainframe, a minicomputer cluster, or a group of servers functioning as a unit. In one example, the server computer may be a database server coupled to a Web server. The payment processing network 26 may use any suitable wired or wireless network, including the Internet.

The issuer 28 may be a bank or other organization that may have an account associated with the consumer 30. The issuer 28 may operate a server which may have a challenge question engine. A transaction history database and a challenge question database may be in communication with a server of issuer 28. The issuer server, challenge question engine, transaction history database, and challenge question database may operate in the same way or a different way than the payment processing network server 26(a), challenge question engine 26(a)-1, transaction history database 26(b), and challenge question database 26(c).

Embodiments of the invention are not limited to the above-described embodiments. For example, although separate functional blocks are shown for an issuer, payment processing network, and acquirer, some entities perform all or any suitable combination of these functions and may be included in embodiments of invention. Additional components may also be included in embodiments of the invention.

VII. Computer Apparatus

Figure 11:
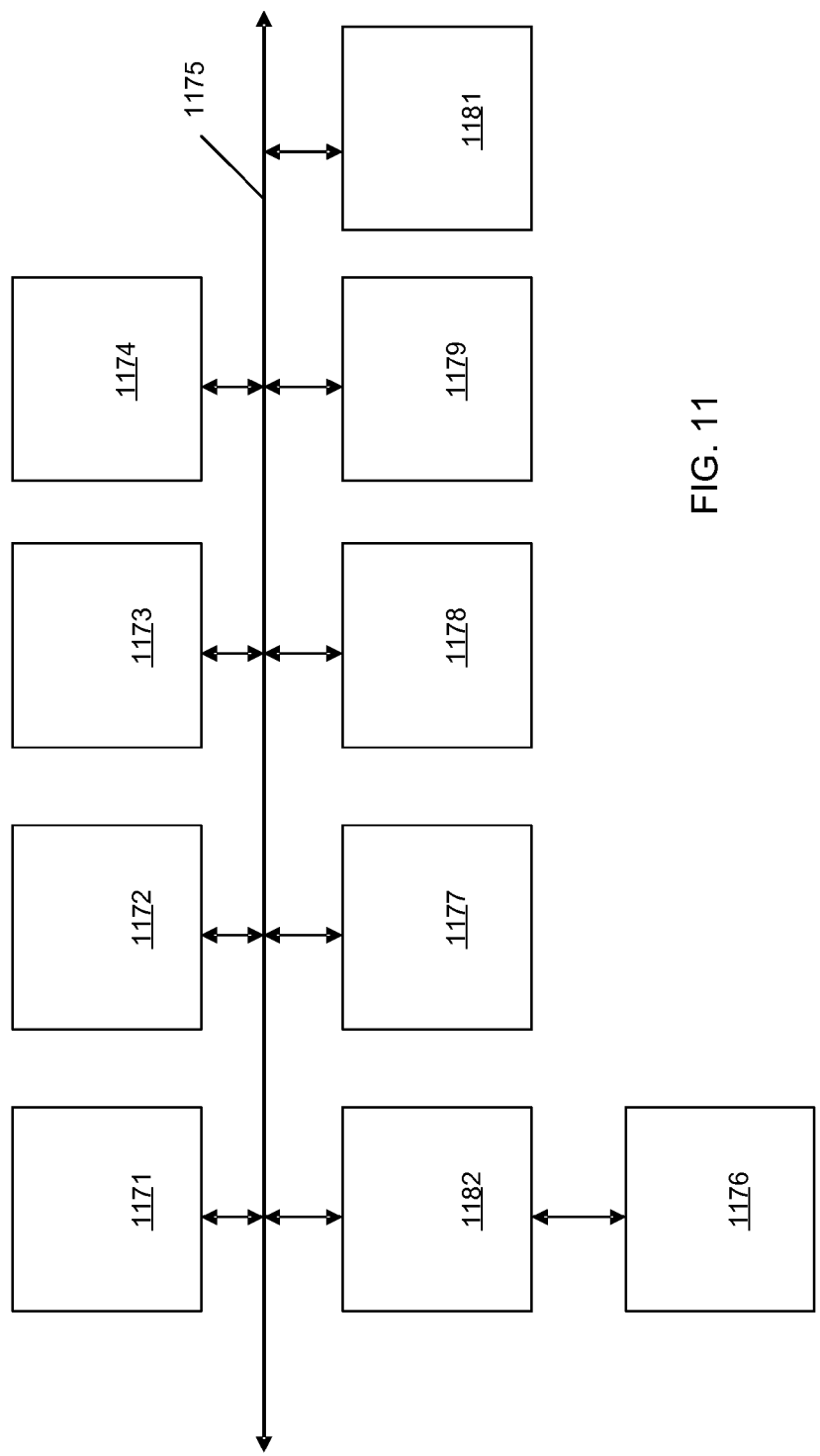
FIG. 11 shows a block diagram of an exemplary computer apparatus usable with system and methods according to embodiments of the present invention.

FIG. 11 shows typical components or subsystems of a computer apparatus. Such components or any subset of such components may be present in various components shown in FIG. 1, including the access device 34, server computers 26(a), 28(a), etc. The subsystems shown in FIG. 11 are interconnected via a system bus 1175. Additional subsystems such as a printer 1174, keyboard 1178, fixed disk 1179, monitor 1176, which is coupled to display adapter 1182, and others are shown. Peripherals and input/output (I/O) devices, which couple to I/O controller 1171, can be connected to the computer system by any number of means known in the art, such as serial port 1177. For example, serial port 1177 or external interface 1181 can be used to connect the computer apparatus to a wide area network such as the Internet, a mouse input device, or a scanner. The interconnection via system bus 1175 allows the central processor 1173 to communicate with each subsystem and to control the execution of instructions from system memory 1172 or the fixed disk 1179, as well as the exchange of information between subsystems. The system memory 1172 and/or the fixed disk 1179 may embody a computer readable medium.

Embodiments of the invention provide for a number of advantages. For example, the number of entities that know a credit card number can be kept at a minimum. Also, the amount of changes that a merchant needs to perform are minimal, such as simply placing one or more IFrames into a checkout page. Also, transaction information, such as device info, amount of the transaction, and the subject items of the transaction can be provided to the network 26, so that the network 26 can, for example, get a head start on a risk analysis and also to determine whether or not to present challenge questions. The challenge questions can also be more complex since an authorization request need not sent until after the challenge questions have been answered and no more questions are deemed necessary.

The specific details of the specific aspects of the present invention may be combined in any suitable manner without departing from the spirit and scope of embodiments of the invention. However, other embodiments of the invention may be directed to specific embodiments relating to each individual aspects, or specific combinations of these individual aspects.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. Computer programs incorporating features of the present invention may be encoded on various computer readable media for storage and/or transmission; suitable media include magnetic disk or tape, optical storage media such as compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive or an entire computer system), and may be present on or within different computer program products within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method for authorizing a transaction between a consumer and a merchant, the method comprising:

receiving, at a server of a non-merchant entity, a consumer message from an access device used by the consumer, wherein the consumer message includes:

account information that identifies an account of the consumer to be used for the transaction; and a transaction identifier that identifies the transaction and that is different from the account information;

receiving, at the non-merchant server, an amount associated with the transaction, wherein the transaction identifier is separate from the amount associated with the transaction;

sending, to a merchant server from the non-merchant server, a funding message including the transaction identifier, wherein the funding message is an authorization response message indicating whether the transaction is approved or not approved, and wherein the non-merchant server sends the funding message after receiving the consumer message; and providing, to the merchant server from the non-merchant server, code that is incorporated into an application page that is sent from the merchant to the consumer before the non-merchant server receives the consumer message, wherein the code provides a link to other code that directs the consumer message to the non-merchant server, the consumer message being created from information in the application page, and wherein the consumer is not required to enroll in any program or service or to have been previously enrolled in any program or service before sending the consumer message.

2. The method of claim 1, further comprising sending, from the non-merchant server to an acquirer, a payment identifier associated with the consumer's account.

3. The method of claim 1, wherein the account information includes a credit card number.

4. The method of claim 1, wherein the non-merchant server is part of a payment processing network, further comprising:
sending an authorization request from the non-merchant server to an issuer of the account; and
receiving an authorization response from the issuer, wherein the authorization response message is based on the authorization response from the issuer.

5. The method of claim 1, wherein the account information includes an account identifier, and wherein the funding message includes a payment identifier.

6. The method of claim 5, wherein the payment identifier is not the account identifier, further comprising:
creating, at the non-merchant server, the payment identifier;
associating the payment identifier with the account identifier; and
receiving the payment identifier from an acquirer as part of an authorization request.

7. The method of claim 1, further comprising:
prior to receiving the consumer message, receiving, at the non-merchant server from the merchant server, a transaction message including the transaction identifier.

8. The method of claim 7, wherein receiving the amount associated with the transaction is accomplished via the transaction message.

9. The method of claim 1, wherein the consumer message is directed to the non-merchant server when the consumer selects a particular payment method.

10. The method of claim 1, wherein the access device used by the consumer is in a retail store associated with the merchant.

11. The method of claim 1, wherein the consumer message is transmitted via a network connection between the access device and the non-merchant server.

12. The method of claim 1, wherein the consumer message is transmitted via SMS or MMS.

13. The method of claim 1, wherein the account information includes an account identifier, wherein the non-merchant entity is associated with an issuer of the consumer's account, and wherein the non-merchant entity creates at least a portion of the account identifier.

14. The method of claim 13, wherein the portion of the account identifier is a Bank Identification Number (BIN) that is associated with the issuer.

15. The method of claim 1, wherein no account information of the consumer's account is sent to the merchant or received from the merchant during the transaction.

16. The method of claim 1, wherein the transaction identifier ties together messages associated with the same transaction.

17. The method of claim 16, wherein the transaction identifier is a value used internally by the merchant to track transactions.

18. The method of claim 1, wherein the other code is stored on the non-merchant server.

19. A system for authorizing a transaction between a consumer and a merchant, the system comprising:
a server having an external interface for receiving a consumer message from an access device used by the consumer, wherein the consumer message includes:
account information that identifies an account of the consumer to be used for the transaction; and
a transaction identifier that identifies the transaction and that is different from the account information, and wherein the server is associated with a non-merchant entity;
one or more processors; and
one or more memory devices containing instructions for directing the one or more processors to:
receive, at the non-merchant server, an amount associated with the transaction, wherein the transaction identifier is separate from the amount associated with the transaction;
send, to a merchant server from the non-merchant server, a funding message including the transaction identifier, wherein the funding message is an authorization response message indicating whether the transaction is approved or not approved, and wherein the non-merchant server sends the funding message after receiving the consumer message; and
provide, to the merchant server from the non-merchant server, code that is incorporated into an application page that is sent from the merchant to the consumer before the non-merchant server receives the consumer message, wherein the code provides a link to other code that directs the consumer message to the non-merchant server,
wherein the consumer is not required to enroll in any program or service or to have been previously enrolled in any program or service before sending the consumer message.

20. The system of claim 19, wherein the one or more processors are further configured to send, to an acquirer, a payment identifier associated with the consumer's account.

21. The system of claim 19, wherein the one or more processors are further configured to:
send an authorization request from the non-merchant server to an issuer of the account; and
receive an authorization response from the issuer, wherein the response message is based on the authorization response from the issuer.

22. The system of claim 19, wherein the account information includes an account identifier, and wherein the funding message includes a payment identifier that is not the account identifier, wherein the one or more processors are further configured to:

create, at the non-merchant server, the payment identifier; and associate the payment identifier with the account identifier.

23. The system of claim 19, wherein the one or more processors are further configured to:

prior to receiving the consumer message, receive, at the non-merchant server from the merchant server, a transaction message including the transaction identifier.

24. A computer program product comprising a non-transitory computer readable medium encoded with a plurality of instructions for controlling a processor to perform an operation for authorizing a transaction between a consumer and a merchant, the instructions comprising:

receiving, at a server of a non-merchant entity, a consumer message from an access device used by the consumer, wherein the consumer message includes:
account information that identifies an account of the consumer to be used for the transaction; and
a transaction identifier that identifies the transaction and that is different from the account information;

receiving, at the non-merchant server, an amount associated with the transaction, wherein the transaction identifier is separate from the amount associated with the transaction; and sending, to a merchant server from the non-merchant server, a funding message including the transaction identifier, wherein the funding message is an authorization response message indicating whether the transaction is approved or not approved, and wherein the non-merchant server sends the funding message after receiving the consumer message; and providing, to the merchant server from the non-merchant server, code that is incorporated into an application page that is sent from the merchant to the consumer before the non-merchant server receives the consumer message, wherein the code provides a link to other code that directs the consumer message to the non-merchant server, the consumer message being created from information in the application page, and wherein the consumer is not required to enroll in any program or service or to have been previously enrolled in any program or service before sending the consumer message.

25. The computer program product of claim 24, wherein the instructions further comprise:

sending, to an acquirer, a payment identifier associated with the consumer's account.

26. The computer program product of claim 24, wherein the non-merchant server is part of a payment processing network, wherein the instructions further comprise:

sending an authorization request from the non-merchant server to an issuer of the account; and receiving an authorization response from the issuer, wherein the authorization response message is based on the authorization response from the issuer.

27. The computer program product of claim 24, wherein the account information includes an account identifier, and wherein the funding message includes a payment identifier.

28. The computer program product of claim 27, wherein the payment identifier is not the account identifier, wherein the instructions further comprise:

creating, at the non-merchant server, the payment identifier; and associating the payment identifier with the account identifier.

29. The computer program product of claim 24, wherein the instructions further comprise:

prior to receiving the consumer message, receiving, at the non-merchant server from the merchant server, a transaction message including the transaction identifier.

30. The computer program product of claim 24, wherein the account information includes an account identifier, wherein the non-merchant entity is associated with an issuer of the consumer's account, and wherein the non-merchant entity creates at least a portion of the account identifier.

\* \* \* \* \*